(12) United States Patent
Yang et al.

(10) Patent No.: US 12,302,335 B2
(45) Date of Patent: May 13, 2025

(54) METHODS AND APPARATUSES FOR TRANSMITTING AND RECEIVING DOWNLINK CONTROL INFORMATION AND COMMUNICATION SYSTEM

(71) Applicant: FUJITSU LIMITED, Kawasaki (JP)

(72) Inventors: Xianjun Yang, Beijing (CN); Guoyu Zhang, Beijing (CN); Pengyu Ji, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 617 days.

(21) Appl. No.: 17/144,697

(22) Filed: Jan. 8, 2021

(65) Prior Publication Data
US 2021/0136736 A1    May 6, 2021

Related U.S. Application Data

(63) Continuation of application No. PCT/CN2018/100092, filed on Aug. 10, 2018.

(51) Int. Cl.
*H04W 72/23* (2023.01)

(52) U.S. Cl.
CPC .................................. *H04W 72/23* (2023.01)

(58) Field of Classification Search
None
See application file for complete search history.

(56) References Cited

U.S. PATENT DOCUMENTS

| 10,827,478 | B2 | 11/2020 | Matsumura et al. |
| 2013/0010682 | A1 | 1/2013 | Kim et al. |
| 2016/0286558 | A1 | 9/2016 | Chae et al. |
| 2018/0020430 | A1 | 1/2018 | Aiba et al. |
| 2018/0220409 | A1 | 8/2018 | Liu et al. |
| 2018/0317254 | A1 | 11/2018 | Hu et al. |
| 2019/0222284 | A1* | 7/2019 | Huang ................. H04W 72/23 |
| 2019/0222370 | A1 | 7/2019 | Zhang et al. |
| 2019/0261357 | A1 | 8/2019 | Lu et al. |

(Continued)

FOREIGN PATENT DOCUMENTS

| CN | 103298117 A | 9/2013 |
| CN | 103874217 A | 6/2014 |
| CN | 104703201 A | 6/2015 |

(Continued)

OTHER PUBLICATIONS

First Notification of Office Action and search report issued on by the China National Intellectual Property for corresponding Chinese Patent Application No. 201880094645.2, mailed on Jun. 29, 2023, with an English translation.

(Continued)

*Primary Examiner* — Suhail Khan
(74) *Attorney, Agent, or Firm* — Myers Wolin, LLC

(57) ABSTRACT

Methods and apparatuses for transmitting and receiving downlink control information and a communication system. The apparatus for transmitting downlink control information (DCI) includes: a first transmitter configured to transmit to a terminal equipment first DCI indicating an interrupted first time-frequency resource used for transmitting uplink data, the first DCI at least comprising a first field indicating a position of the first time-frequency resource.

14 Claims, 11 Drawing Sheets

(56) References Cited

U.S. PATENT DOCUMENTS

2019/0327755 A1* 10/2019 Xiong .................. H04L 5/0046
2019/0364449 A1* 11/2019 Yang ..................... H04W 72/04

FOREIGN PATENT DOCUMENTS

| CN | 104823389 | A | 8/2015 |
|----|-----------|---|--------|
| CN | 106559890 | A | 4/2017 |
| CN | 107409321 | A | 11/2017 |
| CN | 107872834 | A | 4/2018 |
| GB | 2558564 | A | 7/2018 |
| JP | 2013-527677 | A | 6/2013 |
| JP | 2015-228534 | A | 12/2015 |
| JP | 2019-533394 | A | 11/2019 |
| WO | 2017/076178 | A1 | 7/2010 |
| WO | 2018/030418 | A1 | 2/2018 |
| WO | 2018/082485 | A1 | 5/2018 |

OTHER PUBLICATIONS

Notice of Preliminary Rejection issued by the Korean Intellectual Property Office for corresponding Korean Patent Application No. 10-2021-7000611, mailed on Aug. 23, 2022, with an English translation.
Notice of Reasons for Refusal issued by the Japan Patent Office for corresponding Japanese Patent Application No. 2021-500451, mailed on Oct. 18, 2022, with an English translation.
International Search Report and Written Opinion of the International Searching Authority issued by State Intellectual Property Office of P.R. China for the PCT application No. PCT/CN2018/100092, mailed on Apr. 26, 2019, with English translation.
3GPP TS 38.212 V15.1.0, "3rd Generation Partnership Project; Technical Specification Group Radio Access Network; NR; Multiplexing and channel coding (Release 15)", Mar. 2018.
3GPP TS 38.213 V15.1.0, "3rd Generation Partnership Project; Technical Specification Group Radio Access Network; NR; Physical layer procedures for control (Release 15)", Mar. 2018.
Notice of Reasons for Refusal issued by the Japan Patent Office for corresponding Japanese Patent Application No. 2021-500451, mailed on Apr. 5, 2022, with an English translation.
Interdigital Inc., "On dynamic resource sharing between eMBB and URLLC in UL", Agenda Item: 7.2.4, 3GPP TSG-RAN WG1 Meeting #92bis, R1-1804854, Sanya, China, Apr. 16-20, 2018.
Vivo, "Multiplexing data with different transmission durations", Agenda Item: 7.3.3.6, 3GPP TSG RAN WG1 Meeting AH 1801, R1-1800205, Vancouver, Canada, Jan. 22-26, 2018.
Fujitsu, "On eMMB and URLL Multiplexing", Agenda Item: 7.3.3.6, 3GPP TSG RAN WG1 Meeting #91, R1-1719616, Reno, USA, Nov. 27-Dec. 1, 2017.
Qualcomm Incorporated, "eMBB and URLLC dynamic multiplexing and preemption indication on the uplink", Agenda Item: 7.2.4, 3GPP TSG-RAN WG1 #92b, R1-1804820, Sanya, China, Apr. 16-20, 2018.
Extended European search report with supplementary European search report and the European search opinion Issued by the European Patent Office for corresponding European Patent Application No. 18929022.4-1215, dated Jul. 22, 2021.
Interdigital Inc., "On eMBB and URLLC multiplexing in UL", Agenda Item: 7.2.4, 3GPP TSG-RAN WG1 Meeting #92, R1-1802627, Athens, Greece, Feb. 26-Mar. 2, 2018.
Apple Inc., "Discussion on handling of UL multiplexing of transmissions with different reliability requirement", Agenda Item: 7.2.4, 3GPP TSG-RAN WG1 Meeting #92, R1-1802289, Athens, Greece, Feb. 26-Mar. 2, 2018.
Examination Report issued by the Indian Patent Office for corresponding Indian Patent Application No. 202137000155, dated Jan. 11, 2022, with an English translation.
Second Notification of Office Action issued by the China National Intellectual Property Administration for corresponding Chinese Patent Application No. 201880094645.2, mailed on Nov. 7, 2023, with an English translation.
Hearing Notice issued by the Patent Office of India for counterpart Indian Patent Application No. 202137000155, mailed on Jan. 23, 2025, with an English translation.

* cited by examiner

METHODS AND APPARATUSES FOR TRANSMITTING AND RECEIVING DOWNLINK CONTROL INFORMATION AND COMMUNICATION SYSTEM

CROSS-REFERENCE TO RELATED APPLICATION

This application is a continuation application of International Application PCT/CN2018/100092 filed on Aug. 10, 2018 and designated the U.S., the entire contents of which are incorporated herein by reference.

TECHNICAL FIELD

This disclosure relates to the field of communication technologies, and in particular to methods and apparatuses for transmitting and receiving downlink control information and a communication system.

BACKGROUND

In an existing wireless communication system, downlink data transmission from a network device to a terminal equipment may be interrupted by a terminal equipment with a higher priority.

A specific downlink control information format is defined in the existing wireless communication system to indicate which time-frequency resources of low-priority terminal equipments used to carry downlink data are interrupted by high-priority terminal equipments. With the indication of the specific downlink control information format, the low-priority terminal equipments may better demodulate corresponding transmission data blocks.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

As the development of communication technologies, it is possible that uplink data transmission of a terminal equipment is interrupted by a terminal equipment of a higher priority. It was found by the inventors that in the existing communication technologies, there exists no downlink control information indicating to a terminal equipment of a lower priority which time-frequency resources carrying uplink data are interrupted by a terminal equipment of a higher priority.

Embodiments of this disclosure provide methods and apparatuses for transmitting and receiving downlink control information and a communication system, where which time-frequency resources carrying uplink data are interrupted by a terminal equipment of a higher priority may be indicated to a terminal equipment of a lower priority. Hence, when the uplink data transmission of the terminal equipment is interrupted, the terminal equipment may be effectively indicated.

According to a first aspect of the embodiments of this disclosure, there is provided an apparatus for transmitting downlink control information (DCI), configured in a network device, the apparatus including: a first transmitting unit configured to transmit to a terminal equipment first DCI indicating an interrupted first time-frequency resource used for transmitting uplink data, the first DCI at least including a first field indicating a position of the first time-frequency resource.

According to a second aspect of the embodiments of this disclosure, there is provided an apparatus for receiving downlink control information (DCI), configured in a terminal equipment, the apparatus including: a first receiving unit configured to receive first DCI indicating an interrupted first time-frequency resource used for transmitting uplink data transmitted by a network device, the first DCI at least including a first field indicating a position of the first time-frequency resource.

According to a third aspect of the embodiments of this disclosure, there is provided a communication system, including a terminal equipment and a network device, the terminal equipment including the apparatus for receiving downlink control information (DCI) described in the second aspect of the embodiments, and the network device including the apparatus for transmitting downlink control information (DCI) described in the first aspect of the embodiments.

An advantage of the embodiments of this disclosure exists in that when the uplink data transmission of the terminal equipment is interrupted, the terminal equipment may be effectively indicated.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
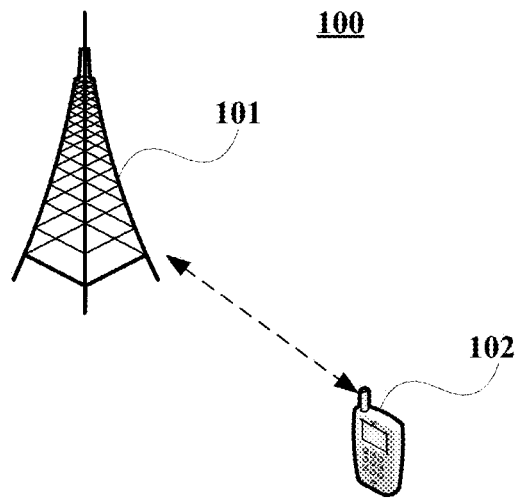
FIG. 1 is a schematic diagram of a communication system of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

In the embodiments of this disclosure, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

In the embodiments of this disclosure, the terminal equipment may include but not limited to the following devices: a cellular phone, a personal digital assistant (PDA), a wireless modem, a wireless communication device, a handheld device, a machine-type communication device, a laptop, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102 (for the sake of simplicity, description is given in FIG. 1 by taking one terminal equipment as an example).

In the embodiment of this disclosure, existing traffics or traffics that may be implemented in the future may be performed between the network device 101 and the terminal equipments 102. For example, such traffics may include but not limited to enhanced mobile broadband (eMBB), massive machine type communication (MTC), and ultra-reliable and low-latency communication (URLLC), etc.

In the embodiments of this disclosure, the terminal equipment 102 may transmit data to the network device 101, for example, in a granted or grant-free transmission mode. The network device 101 may receive data transmitted by one or more terminal equipments 102, and feedback information, such as acknowledgement ACK/non-acknowledgement NACK, to the terminal equipment 102, and the terminal equipment 102 may acknowledge terminating a transmission process according to the feedback information, or may further perform new data transmission, or may perform data retransmission.

Furthermore, before the terminal equipment 102 accesses to the network device 101, the network device 101 may transmit information related to system information to the terminal equipment 102, and the terminal equipment 102 detects the received information to achieve downlink synchronization, and establish connection with the network device 101.

Following description shall be given by taking a network device in a communication system as a transmitter end and a terminal equipment therein as a receiver end as examples. However, this disclosure is not limited thereto, and the transmitter end and/or the receiver end may also be other devices. For example, this disclosure is applicable not only to signal transmission between a network device and a terminal equipment, but also to signal transmission between two terminal equipments.

Embodiment 1

The embodiment of this disclosure provides a method for transmitting downlink control information (DCI), which may be carried out by a network device.

Figure 2:
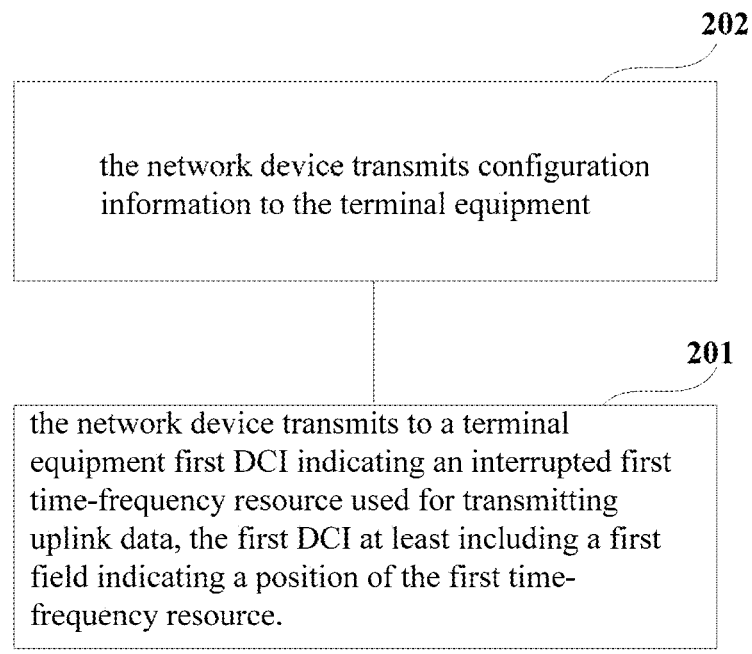
FIG. 2 is a schematic diagram of the method for transmitting downlink control information of Embodiment 1 of this disclosure.

FIG. 2 is a schematic diagram of the method for transmitting downlink control information (DCI) of this embodiment. As shown in FIG. 2, the method includes:
step 201: the network device transmits to a terminal equipment first DCI indicating an interrupted first time-frequency resource used for transmitting uplink data, the first DCI at least including a first field indicating a position of the first time-frequency resource.

According to this embodiment, which time-frequency resources carrying uplink data are interrupted by a terminal equipment of a higher priority may be indicated to the terminal equipment. Hence, when the uplink data transmission of the terminal equipment is interrupted, the terminal equipment may be effectively indicated.

In this embodiment, that the first time-frequency resource is interrupted, which may also be referred to as preempted, means that when the terminal equipment transmits uplink data via the first time-frequency resource, the terminal equipment is interrupted by a terminal equipment of higher priority.

In this embodiment, when the first time-frequency resource of the terminal equipment is interrupted, the terminal equipment has a lower priority on the first time-frequency resource. An implementation mode of the lower priority (i.e. the mode in which the uplink data transmission is interrupted) may be, for example, that the terminal equipment does not transmit the uplink data carried by the first time-frequency resource on the first time-frequency resource, or transmits the uplink data carried by the first time-frequency resource at reduced power, or transmits the uplink data carried by the first time-frequency resource in a nonorthogonal multiple access manner. That transmits the uplink data at reduced power refers to that the terminal equipment reduces transmission power relative to normal transmission power, so as to transmit the uplink data at power lower than that of the terminal equipment of a higher priority.

In this embodiment, an implementation mode of the lower priority may be indicated by the first DCI to the terminal equipment, or may be preset.

In this embodiment, the terminal equipment may monitor the first DCI at a period, the period being less than or equal to a period at which the terminal equipment monitors second DCI, the second DCI being used to indicate that the terminal equipment transmits uplink data on a second time-frequency resource.

In this embodiment, a DCI format of the first DCI is identical to or different from a DCI format of third DCI, the third DCI may be used to indicate to the terminal equipment an interrupted third time-frequency resource used for transmitting downlink data. The third DCI may be DCI with a specific format, for example, it may be the DCI format 2_1 defined in Standard Rel-15 of the first stage of 5G.

In this embodiment, that the DCI format of the first DCI is identical to the DCI format of the third DCI refers to that the first DCI and the third DCI have identical usages, that is, they are used to indicate that a resource is interrupted or preempted, and the first DCI and the third DCI use identical fields, but values of the fields are different. When the DCI format of the first DCI and the DCI format of the third DCI are identical, the DCI format of the first DCI may be added with an information field relative to the format of the third DCI, an information bit in the information field is used to indicate whether currently transmitted DCI is the first DCI or the third DCI; for example, when the information field is 0, it indicates that the DCI is the first DCI, and when the information field is 1, it indicates that the DCI is the third DCI.

In addition, when the DCI format of the first DCI is identical to the DCI format of the third DCI, as the third DCI is UE-group common DCI, the first DCI is also UE-group common DCI.

In this embodiment, that the DCI format of the first DCI is different from the DCI format of the third DCI refers to that the first DCI and the third DCI have different usages, that is, the first DCI is used to indicate that an uplink resource is interrupted or preempted, the third DCI is used to indicate that a downlink resource is interrupted or preempted, and the first DCI and the third DCI have different fields. When the DCI format of the first DCI is different from the DCI format of the third DCI, the first DCI is UE-specific DCI of the terminal equipment, or the first DCI is UE-group common DCI. The UE-specific DCI refers to DCI that is only used to indicate to the terminal equipment, and the UE-group common DCI refers to DCI used to indicate to terminal equipments in a terminal equipment group containing the terminal equipment.

In this embodiment, the first field of the first DCI may include at least one first sub-field, the first sub-field corresponding to a serving cell of the terminal equipment. Hence, the first sub-field may indicate a position of the first time-frequency resource for the corresponding serving cell.

A length of data bit of the first sub-field may be of a fixed value, or may be of a variable value. The fixed value may be, for example, a preset value, the preset value being, for example, an ex-works preset value of the network device, or an ex-works preset value of the terminal equipment. In this embodiment, the length of data bit of the first sub-field may be configured by the network device for the terminal equipment, such as being configured by the network device for the terminal equipment via higher layer signaling.

In this embodiment, when a division manner of a frequency domain of the first time-frequency resource is that a whole frequency band is taken as a division unit, more than one data bits of the first sub-field may be used to indicate whether a time unit in the frequency band is interrupted, or one data bit of the first sub-field may be used to indicate whether more than one time units in the frequency band are interrupted.

For example, in the time domain, the length of the data bit of the first sub-field is of a fixed value L, such as 14 bits, and the first sub-field is used to indicate which time units of N time units in the first time-frequency resource are interrupted; where, N and L are both natural numbers. In this embodiment, the first time-frequency resource may be N time units after n+N3 in the time domain; where, n is a time unit when the terminal equipment detects the first DCI, and N3 is needed time unit during the terminal equipment demodulates the first DCI and prepares for switching to a relatively low priority.

If $N \leq L$, when $0 \leq j < L - \lfloor L/N \rfloor \cdot N$, $\lceil L/N \rceil$ consecutive bits indicate whether a j-th time unit is interrupted; and when $L - \lfloor L/N \rfloor \cdot N \leq j < N$, $\lfloor L/N \rfloor$ consecutive bits indicate whether the j-th time unit is interrupted; or, if $N > L$, N time units may be divided into L groups, the L groups corresponding to L bits one by one; for example, in former $N - \lfloor N/L \rfloor \cdot L$ groups of time units, each group contains $\lceil N/L \rceil$ time units; and in latter $L - N + \lfloor N/L \rfloor \cdot L$ groups of time units, each group contains $\lfloor N/L \rfloor$ time units.

In one embodiment, in the L data bits in the first sub-field, when a value of a data bit (in a case where one data bit corresponds to one or more time units) or a segment of consecutive data bits (in a case where more than one data bits correspond to one time unit or one time unit group) is a first value, it indicates that the corresponding time unit is interrupted in the entire frequency domain; and when a value of a data bit or a segment of consecutive data bits is a second value, it indicates that the corresponding time unit is not interrupted in the entire frequency domain. The first value and the second value may be 0 and 1, respectively, or consecutive 0 and consecutive 1, or 1 and 0, or consecutive 1 and consecutive 0.

For another example, in the time domain, a length of a data bit of a first sub-field is of a variable value $L_v$, the first sub-field being used to indicate which time units in N time units in the first time-frequency resource are interrupted; where, N and $L_v$ are both natural numbers.

If $L_v = N$, each bit in data bits of the first sub-field corresponds to a time unit; or, if $L_v = \lceil N/q \rceil$, each bit in the data bits of the first sub-field corresponds to a group of time units, each group of time units containing q time units; where, q may be a natural number greater than or equal to 2; or, if $L_v = mN$, each m consecutive bits in the data bits of the first sub-field correspond to one time unit; or, if $L_v = \lceil N/q \rceil$, each m consecutive bits in the data bits of the first sub-field correspond to one group of time units, each group of time units containing q time units; where, q may be a natural number greater than or equal to 2.

In one implementation, in the $L_v$ data bits of the first sub-field, when a value of a data bit or a segment of consecutive data bits is a first value, it indicates that the corresponding time unit is interrupted in the entire frequency domain; and when a value of a data bit or a segment of consecutive data bits is a second value, it indicates that the corresponding time unit is not interrupted in the entire frequency domain. The first value and the second value may be 0 and 1, respectively, or consecutive 0 and consecutive 1, or 1 and 0, or consecutive 1 and consecutive 0.

In this embodiment, when a division manner of a frequency domain of the first time-frequency resource is that a part of frequency band in an activated whole frequency band (the activated whole frequency band is, for example, a bandwidth part (BWP)) is taken as a division unit, a frequency domain of the interrupted data transmission resource may be divided into more than two partial frequency bands. The first sub-field may include at least two groups of data bits, each group of data bits corresponding to one of the partial frequency bands, and in the groups of data bits, one or more than one data bits indicate whether one time unit in the partial frequency bands is interrupted, or, one data bit indicates whether one or more than one time units in the partial frequency bands are interrupted.

Following description of this embodiment shall be given by taking that the frequency domain of the first time-frequency resource is divided into two partial frequency bands as an example, and when the frequency domain of the first time-frequency resource is divided into three or more partial frequency bands, reference may be made to the following explanations.

For example, the frequency domain of the first time-frequency resource is divided into two partial frequency bands, a length of the data bit of the first sub-field is of a fixed value L, such as 14 bits, and the first sub-field of the length L may be divided into two groups, the first group containing $\lceil L/2 \rceil$ bits, and the second group containing $\lfloor L/2 \rfloor$ bits. The first group of data bits may be used to indicate a former half of the entire frequency band, i.e. former $\lceil B_{INT}/2 \rceil$ physical resource blocks (PRBs); where, $B_{INT}$ is the total number of PRBs contained in the entire frequency band; and the second group of bits is used to indicate a latter half of the entire frequency band, i.e. latter $\lfloor B_{INT}/2 \rfloor$ PRBs.

In the time domain, data bits of the first group may be used to indicate time units in the N time units on which former $\lceil B_{INT}/2 \rceil$ PRBs are interrupted, and data bits of the second group may be used to indicate time units in the N time units on which latter $\lfloor B_{INT}/2 \rfloor$ PRBs are interrupted.

The data bits of the above first group shall be explained below.

If $N \leq \lceil L/2 \rceil$, when $0 \leq j < \lceil L/2 \rceil - \lfloor \lceil L/2 \rceil/N \rfloor \cdot N$, $\lceil \lceil L/2 \rceil/N \rceil$ consecutive bits indicate whether a j-th time unit is preempted; and when $\lceil L/2 \rceil - \lfloor \lceil L/2 \rceil/N \rfloor \cdot N \leq j < N$, $\lfloor \lceil L/2 \rceil/N \rfloor$ consecutive bits indicate whether the j-th time unit is preempted; or, if $N > \lceil L/2 \rceil$, N time units are divided into $\lceil L/2 \rceil$ groups and correspond to $\lceil L/2 \rceil$ bits one by one. In particular, in former $N - \lfloor N/\lceil L/2 \rceil \rfloor \cdot \lceil L/2 \rceil$ groups of time units, each group contains $\lceil N/\lceil L/2\rceil \rceil$ time units, and in latter $\lceil L/2\rceil-N+\lfloor N/\lceil L/2\rceil\rfloor\cdot\lceil L/2\rceil$ groups of time units, each group contains $\lfloor N/\lceil L/2\rceil\rfloor$ time units.

The data bits of the above second group shall be explained below.

If $N\le\lceil L/2\rceil$, when $0\le j<\lfloor L/2\rfloor-\lfloor\lceil L/2\rceil/N\rfloor\cdot N$, $\lceil\lfloor L/2\rfloor/N\rceil$ consecutive bits indicate whether a j-th time unit is preempted; and when $\lfloor L/2\rfloor-\lfloor\lceil L/2\rceil/N\rfloor\cdot N\le j<N$, $\lfloor\lfloor L/2\rfloor/N\rfloor$ consecutive bits indicate whether the j-th time unit is preempted; or, if $N>\lfloor L/2\rfloor$, N time units are divided into $\lfloor L/2\rfloor$ groups and correspond to $\lfloor L/2\rfloor$ bits one by one. In particular, in former $N-\lfloor N/\lfloor L/2\rfloor\rfloor\cdot\lfloor L/2\rfloor$ groups of time units, each group contains $\lceil N/\lfloor L/2\rfloor\rceil$ time units, and in latter $\lfloor L/2\rfloor-N+\lfloor N/\lfloor L/2\rfloor\rfloor\cdot\lfloor L/2\rfloor$ groups of time units, each group contains $\lfloor N/\lfloor L/2\rfloor\rfloor$ time units.

In one implementation, in the L data bits of the first sub-field, when a value of a data bit or a segment of consecutive data bits is a first value, it indicates that the corresponding time unit is interrupted in a corresponding bandwidth part; and when a value of a data bit or a segment of consecutive data bits is a second value, it indicates that the corresponding time unit is not interrupted in the corresponding bandwidth part. The first value and the second value may be 0 and 1, respectively, or consecutive 0 and consecutive 1, or 1 and 0, or consecutive 1 and consecutive 0.

For another example, the frequency domain of the first time-frequency resource is divided into two partial frequency bands, a length of the data bit of the first sub-field is of a variable value $L_v$, and the first sub-field of the length $L_v$ may be divided into two groups, the first group containing $\lceil L_v/2\rceil$ bits, and the second group containing $\lceil L_v/2\rceil$ bits. The first group of data bits may be used to indicate a former half of the entire frequency band, i.e. former $\lceil B_{INT}/2\rceil$ physical resource blocks (PRBs), and the second group of bits is used to indicate a latter half of the entire frequency band, i.e. latter $\lfloor B_{INT}/2\rfloor$ PRBs.

In the time domain, the data bits of the first group may be used to indicate time units in the N time units on which former $\lceil B_{INT}/2\rceil$ PRBs are interrupted, and the data bits of the second group may be used to indicate time units in the N time units on which latter $\lceil B_{INT}/2\rceil$ PRBs are interrupted. Let L' denote a data bit length of each group, where, for the first group, $L'=\lceil L_v/2\rceil$, and for the second group, $L'=\lfloor L_v/2\rfloor$. Following description shall be given to either one of the first group of data bits and the second group of data bits.

If L'=N, each bit in the group of data bits corresponds to a time unit; or, if $L'=\lceil N/q\rceil$, each bit in the group of data bits corresponds to a group of time units, each group of time units containing q time units; where, q may be a natural number greater than or equal to 2; or, if L'=mN, each m consecutive bits in the group of data bits correspond to a time unit; or, if $L'=m\lceil N/q\rceil$, each m consecutive bits in the group of data bits correspond to a group of time units, each group of time units containing q time units; where, q may be a natural number greater than or equal to 2.

In one implementation, in the $L_v$ data bits of the first sub-field, when a value of a data bit or a segment of consecutive data bits is a first value, it indicates that the corresponding time unit is interrupted in a corresponding bandwidth part; and when a value of a data bit or a segment of consecutive data bits is a second value, it indicates that the corresponding time unit is not interrupted in the corresponding bandwidth part. The first value and the second value may be 0 and 1, respectively, or consecutive 0 and consecutive 1, or 1 and 0, or consecutive 1 and consecutive 0.

In this embodiment, the above time unit may include one or two or more than two slots, or, one or two or more than two non-slots, or one or two or more than two micro-slots, or one or two or more than two symbols, etc.

In this embodiment, as shown in FIG. 2, the method may further include:
step 202: the network device transmits configuration information to the terminal equipment.

In step 202, the network device may transmit the configuration information to the terminal equipment via higher-layer signaling.

In this embodiment, the configuration information at least includes first configuration information, the first configuration information being used to configure the first DCI.

In this embodiment, the configuration information may further include at least one piece of the following configuration information:
  second configuration information, the second configuration information being used to configure the terminal equipment not to transmit the uplink data carried on the first time-frequency resource, or transmit the uplink data at reduced power, or transmit the uplink data in a nonorthogonal multiple access manner;
  third configuration information, the third configuration information being used to configure that the nonorthogonal multiple access manner is sparse code multiple access (SCMA), or multi-user shared access (MUSA), or interweaver division multiple access (IDDMA), or other nonorthogonal multiple access manners;
  fourth configuration information, the fourth configuration information being used to configure codewords in nonorthogonal multiple access with signatures being sparse used for distinguishing users, or nonorthogonal codewords, or interleavers, or other codewords for distinguishing signatures of users;
  fifth configuration information, the fifth configuration information being used to configure a length of the first sub-field and/or a length of the first field;
  sixth configuration information, the sixth configuration information being used to configure that a division manner of the first time-frequency resource indicated by the first sub-field on the frequency domain is in a division unit of a whole frequency band, or in a division unit of a partial frequency band;
  seventh configuration information, the seventh configuration information being used to configured that a time unit of the first time-frequency resource indicated by the first sub-field on the time domain is one or more than two slots, or one or more than two non-slots, or one or more than two micro-slots, or one or more than two symbols;
  eighth configuration information, the eighth configuration information being used to configure the terminal equipment with a period for monitoring first DCI;
  ninth configuration information, the fourth configuration information being used to configure a set of serving cell indices of the terminal equipment;
  tenth configuration information, the fourth configuration information being used to configure a position of a first sub-field to which each serving cell of the terminal equipment corresponds in the first field; and
  eleventh configuration information, the fourth configuration information being used to configure a radio network temporary identifier (RNTI) scrambling the first DCI.

In this embodiment, different pieces of configuration information may be transmitted via different pieces of higher-layer signaling.

Furthermore, in another implementation, information configured by at least one pieces of the second to the eleventh configuration information may be predetermined information, hence, the terminal equipment may be configured with no need of configuration information.

According to this embodiment, which time-frequency resources carrying uplink data are interrupted by a terminal equipment of a higher priority may be indicated to the terminal equipment via the downlink control information, hence, when the uplink data transmission of the terminal equipment is interrupted, the terminal equipment may be effectively indicated.

Embodiment 2

Embodiment 2 provides a method for receiving downlink control information (DCI), which may be carried out by a terminal equipment taken as a receiver end.

Figure 3:
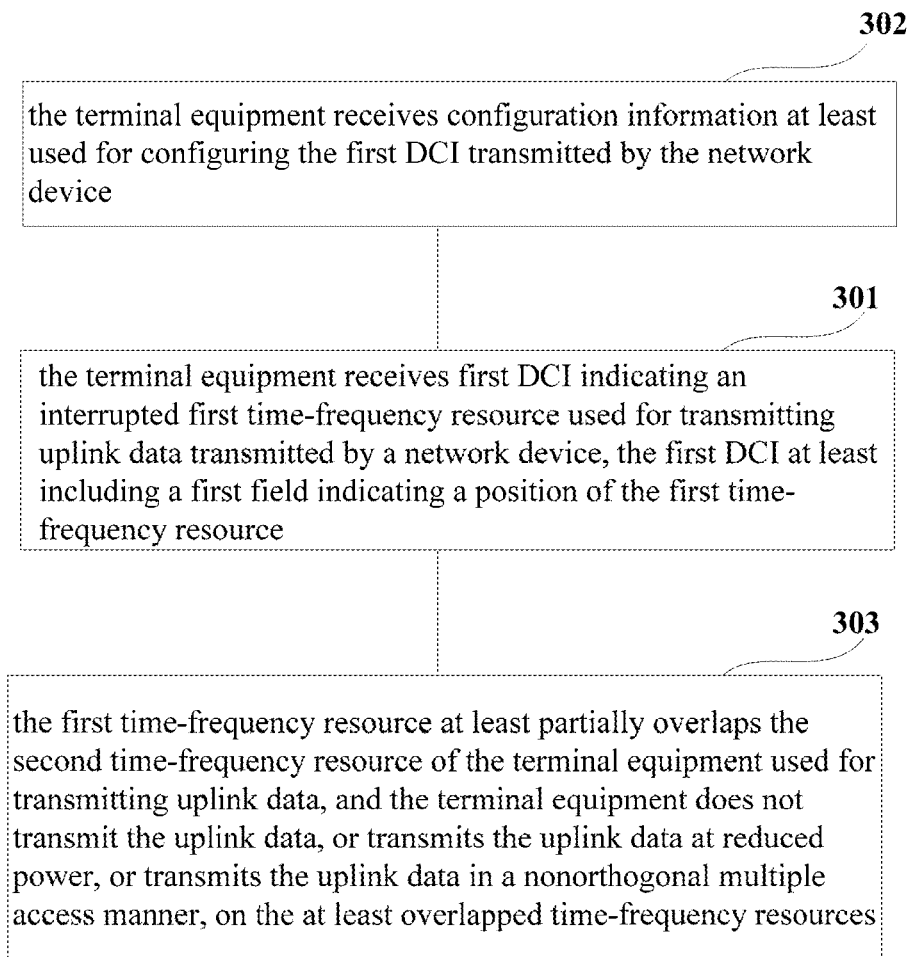
FIG. 3 is a schematic diagram of the method for receiving downlink control information of Embodiment 2 of this disclosure.

FIG. 3 is a schematic diagram of the method for receiving downlink control information of Embodiment 2. As shown in FIG. 3, the method includes:
step 301: the terminal equipment receives first DCI indicating an interrupted first time-frequency resource used for transmitting uplink data transmitted by a network device, the first DCI at least including a first field indicating a position of the first time-frequency resource.

According to this embodiment, which time-frequency resources carrying uplink data are interrupted by a terminal equipment of a higher priority may be indicated to the terminal equipment. Hence, when the uplink data transmission of the terminal equipment is interrupted, the terminal equipment may be effectively indicated.

In this embodiment, the first DCI is further used to indicate the terminal equipment: not to transmit the uplink data carried by the first time-frequency resource on the first time-frequency resource, or transmit the uplink data at reduced power, or transmit the uplink data in a nonorthogonal multiple access manner.

In this embodiment, a period of the terminal equipment used for monitoring the first DCI is less than or equal to a period of the terminal equipment used for monitoring second DCI, the second DCI being used for indicating the terminal equipment to transmit uplink data on a second time-frequency resource.

In this embodiment, a DCI format of the first DCI is identical to or different from a DCI format of third DCI, the third DCI being used for indicating to the terminal equipment an interrupted third time-frequency resource used for transmitting downlink data.

In this embodiment, when the DCI format of the first DCI is identical to the DCI format of the third DCI, the first DCI is larger than the third DCI by an information field, an information bit in the information field being used for indicating whether currently transmitted DCI is the first DCI or the third DCI.

In this embodiment, when the DCI format of the first DCI is different from the DCI format of the third DCI, the first DCI is UE-specific DCI of the terminal equipment, or the first DCI is UE-group common DCI.

In this embodiment, the first field includes at least one first sub-field, the first sub-field corresponding to a serving cell of the terminal equipment.

In this embodiment, a length of the first sub-field is a predetermined length, or a length configured by the network device via configuration signaling.

In this embodiment, reference may be made to the description in Embodiment 1 of this disclosure for a correspondence between data bits in the first sub-field and the time units in the first time-frequency resource.

For example, when a division manner of a frequency domain of the interrupted first time-frequency resource is that a whole frequency band is taken as a division unit, one or more than one data bits of the first sub-field indicate whether a time unit in the frequency band is interrupted, or one data bit of the first sub-field indicates whether one or more than one time units in the frequency band are interrupted.

For another example, when a division manner of a frequency domain of the interrupted first time-frequency resource is that a part of frequency band in a whole frequency band is taken as a division unit, a frequency domain of the interrupted data transmission resource is divided into more than two partial frequency bands, the first sub-field includes at least two groups of data bits, each group of data bits corresponding to said partial frequency bands, and in the groups of data bits, one or more than one data bits indicate whether one time unit in the partial frequency bands is interrupted, or, one data bit indicates whether one or more than one time units in the partial frequency bands are interrupted.

In this embodiment, as shown in FIG. 3, the method further includes:
step 302: the terminal equipment receives configuration information at least used for configuring the first DCI transmitted by the network device.

In this embodiment, the terminal equipment may receive the configuration information via higher-layer signaling.

In this embodiment, the configuration information at least includes first configuration information, the first configuration information being used to configure the first DCI.

In this embodiment, the configuration information may further include at least one piece of the following configuration information:
second configuration information, the second configuration information being used to configure the terminal equipment not to transmit the uplink data carried on the first time-frequency resource, or transmit the uplink data at reduced power, or transmit the uplink data in a nonorthogonal multiple access manner;
third configuration information, the third configuration information being used to configure that the nonorthogonal multiple access manner is sparse code multiple access (SCMA), or multi-user shared access (MUSA), or interweaver division multiple access (IDDMA), or other nonorthogonal multiple access manners;
fourth configuration information, the fourth configuration information being used to configure codewords in nonorthogonal multiple access with signatures being sparse used for distinguishing users, or nonorthogonal codewords, or interleavers, or other codewords for distinguishing signatures of users;
fifth configuration information, the fifth configuration information being used to configure a length of the first sub-field and/or a length of the first field;
sixth configuration information, the sixth configuration information being used to configure that a division manner of the first time-frequency resource indicated by the first sub-field on the frequency domain is in a division unit of a whole frequency band, or in a division unit of a partial frequency band;

seventh configuration information, the seventh configuration information being used to configured that a time unit of the first time-frequency resource indicated by the first sub-field on the time domain is one or two or more than two slots, or one or two or more than two non-slots, or one or two or more than two micro-slots, or one or two or more than two symbols;

eighth configuration information, the eighth configuration information being used to configure the terminal equipment with a period for monitoring first DCI;

ninth configuration information, the fourth configuration information being used to configure a set of serving cell indices of the terminal equipment;

tenth configuration information, the fourth configuration information being used to configure a position of a first sub-field to which each serving cell of the terminal equipment corresponds in the first field; and eleventh configuration information, the fourth configuration information being used to configure a radio network temporary identifier (RNTI) scrambling the first DCI.

In this embodiment, different pieces of configuration information may be transmitted via different pieces of higher-layer signaling.

Furthermore, in another implementation, information configured by at least one pieces of the second to the eleventh configuration information may be predetermined information, hence, the terminal equipment may be configured with no need of configuration information.

In this embodiment, as shown in FIG. 3, the method further includes:

step 303: the first time-frequency resource at least partially overlaps the second time-frequency resource of the terminal equipment used for transmitting uplink data, and the terminal equipment does not transmit the uplink data, or transmits the uplink data at reduced power, or transmits the uplink data in a nonorthogonal multiple access manner, on the at least overlapped time-frequency resources.

In step 303 of this embodiment, when there exist the above overlapped time-frequency resources, in one implementation, the terminal equipment does not transmit the uplink data, or transmits the uplink data at reduced power, or transmits the uplink data in a nonorthogonal multiple access manner, on the overlapped time-frequency resources;

in another implementation, the terminal equipment does not transmit the uplink data, or transmits the uplink data at reduced power, or transmits the uplink data in a nonorthogonal multiple access manner, on the second time-frequency resource; that is, the priority of the terminal equipment is not only reduced on the overlapped time-frequency resources, but also on the whole second time-frequency resource; and this case is applicable to a situation where the terminal equipment has not started to transmit data on the second time-frequency resource when the first DCI is received;

in a further implementation, the terminal equipment does not transmit the uplink data, or transmits the uplink data at reduced power, or transmits the uplink data in a nonorthogonal multiple access manner, on the second time-frequency resource after the first DCI is received; and this case is applicable to a situation where the terminal equipment has transmitted data on the second time-frequency resource before the first DCI is received.

For example, the terminal equipment may perform blind detection, and after detecting the received first DCI, determine whether the second time-frequency resource used for transmitting the uplink data and the first time-frequency resource at least partially overlap. The first time-frequency resource may be an N-th time unit after n+N3 in the time domain; where, n is a time unit when the terminal equipment detects the first DCI, and N3 is needed time unit during the terminal equipment demodulates the first DCI and prepares for switching to a relatively low priority.

When the terminal equipment determines that there exists overlapping, the terminal equipment does not transmit uplink data, or transmits uplink data at reduced power, or transmits uplink data in a nonorthogonal multiple access manner, on the least partially overlapped time-frequency resources.

When the terminal equipment determines that there exists no overlapping, the terminal equipment performs normal uplink data transmission on the second time-frequency resource.

According to this embodiment, which time-frequency resources carrying uplink data are interrupted by a terminal equipment of a higher priority may be indicated to the terminal equipment via the downlink control information, hence, when the uplink data transmission of the terminal equipment is interrupted, the terminal equipment may be effectively indicated.

Embodiment 3

Embodiment 3 provides an apparatus for transmitting downlink control information (DCI). As a principle of the apparatus for solving problems is similar to that of the method in Embodiment 1, reference may be made to the implementation of the method in Embodiment 1 for implementation of this apparatus, with identical contents being going to be described herein any further.

Figure 4:
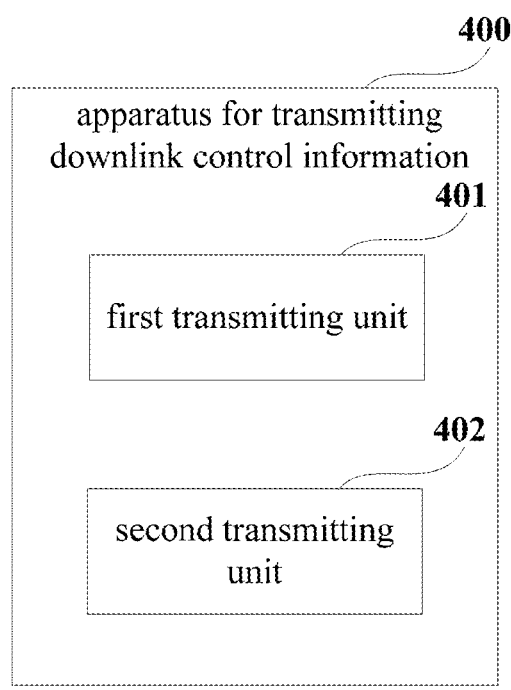
FIG. 4 is a schematic diagram of the apparatus for transmitting downlink control information of Embodiment 3 of this disclosure.

FIG. 4 is a schematic diagram of the apparatus for transmitting downlink control information (DCI) of Embodiment 3. As shown in FIG. 4, an apparatus for transmitting downlink control information 400 includes a first transmitting unit 401. The first transmitting unit 401 is configured to transmit to a terminal equipment first DCI indicating an interrupted first time-frequency resource used for transmitting uplink data, the first DCI at least including a first field indicating a position of the first time-frequency resource.

In this embodiment, the first DCI is further used to indicate the terminal equipment not to transmit the uplink data carried by the first time-frequency resource on the first time-frequency resource, or transmit the uplink data at reduced power, or transmit the uplink data in a nonorthogonal multiple access manner.

In this embodiment, a period used for monitoring the first DCI configured by the apparatus for the terminal equipment is less than or equal to a period used for monitoring second DCI configured by the apparatus for the terminal equipment, the second DCI being used for indicating the terminal equipment to transmit uplink data on a second time-frequency resource.

In this embodiment, a DCI format of the first DCI is identical to or different from a DCI format of third DCI, the third DCI being used for indicating to the terminal equipment an interrupted third time-frequency resource used for transmitting downlink data.

In this embodiment, when the DCI format of the first DCI is identical to the DCI format of the third DCI, the first DCI is larger than the third DCI by an information field, an information bit in the information field being used for indicating whether currently transmitted DCI is the first DCI or the third DCI.

In this embodiment, when the DCI format of the first DCI is different from the DCI format of the third DCI, the first DCI is UE-specific DCI of the terminal equipment, or the first DCI is UE-group common DCI.

In this embodiment, the first field includes at least one first sub-field, the first sub-field corresponding to a serving cell of the terminal equipment.

In this embodiment, a length of the first sub-field is a predetermined length, or a length configured by configuration information transmitted by the apparatus 400.

In this embodiment, when a division manner of a frequency domain of the interrupted first time-frequency resource is that a whole frequency band is taken as a division unit, one or more than one data bits of the first sub-field indicate whether a time unit in the frequency band is interrupted, or one data bit of the first sub-field indicates whether one or more than one time units in the frequency band are interrupted.

In this embodiment, when a division manner of a frequency domain of the interrupted first time-frequency resource is that a part of frequency band in a whole frequency band is taken as a division unit, a frequency domain of the interrupted data transmission resource is divided into two or more than two partial frequency bands, the first sub-field includes at least two groups of data bits, each group of data bits corresponding to said partial frequency bands, and in the groups of data bits, one or more than one data bits indicate whether one time unit in the partial frequency bands is interrupted, or, one data bit indicates whether one or more than one time units in the partial frequency bands are interrupted.

In this embodiment, as shown in FIG. 4, the apparatus 400 further includes a second transmitting unit 402. The second transmitting unit 402 is configured to transmit to the terminal equipment configuration information at least used for configuring the first DCI.

In this embodiment, the configuration information at least includes first configuration information, the first configuration information being used to configure the first DCI.

In this embodiment, the configuration information may further include at least one piece of the following configuration information:

second configuration information, the second configuration information being used to configure the terminal equipment not to transmit the uplink data carried on the first time-frequency resource, or transmit the uplink data at reduced power, or transmit the uplink data in a nonorthogonal multiple access manner;

third configuration information, the third configuration information being used to configure that the nonorthogonal multiple access manner is sparse code multiple access (SCMA), or multi-user shared access (MUSA), or interweaver division multiple access (IDDMA), or other nonorthogonal multiple access manners;

fourth configuration information, the fourth configuration information being used to configure codewords in nonorthogonal multiple access with signatures being sparse used for distinguishing users, or nonorthogonal codewords, or interleavers, or other codewords for distinguishing signatures of users;

fifth configuration information, the fifth configuration information being used to configure a length of the first sub-field and/or a length of the first field;

sixth configuration information, the sixth configuration information being used to configure that a division manner of the first time-frequency resource indicated by the first sub-field on the frequency domain is in a division unit of a whole frequency band, or in a division unit of a partial frequency band;

seventh configuration information, the seventh configuration information being used to configured that a time unit of the first time-frequency resource indicated by the first sub-field on the time domain is one or more than two slots, or one or more than two non-slots, or one or more than two micro-slots, or one or more than two symbols;

eighth configuration information, the eighth configuration information being used to configure the terminal equipment with a period for monitoring first DCI;

ninth configuration information, the fourth configuration information being used to configure a set of serving cell indices of the terminal equipment;

tenth configuration information, the fourth configuration information being used to configure a position of a first sub-field to which each serving cell of the terminal equipment corresponds in the first field; and eleventh configuration information, the fourth configuration information being used to configure a radio network temporary identifier (RNTI) scrambling the first DCI.

According to this embodiment, which time-frequency resources carrying uplink data are interrupted by a terminal equipment of a higher priority may be indicated to the terminal equipment via the downlink control information, hence, when the uplink data transmission of the terminal equipment is interrupted, the terminal equipment may be effectively indicated.

Embodiment 4

Embodiment 4 provides an apparatus for receiving downlink control information (DCI). As a principle of the apparatus for solving problems is similar to that of the method in Embodiment 2, reference may be made to the implementation of the method in Embodiment 2 for implementation of this apparatus, with identical contents being going to be described herein any further.

Figure 5:
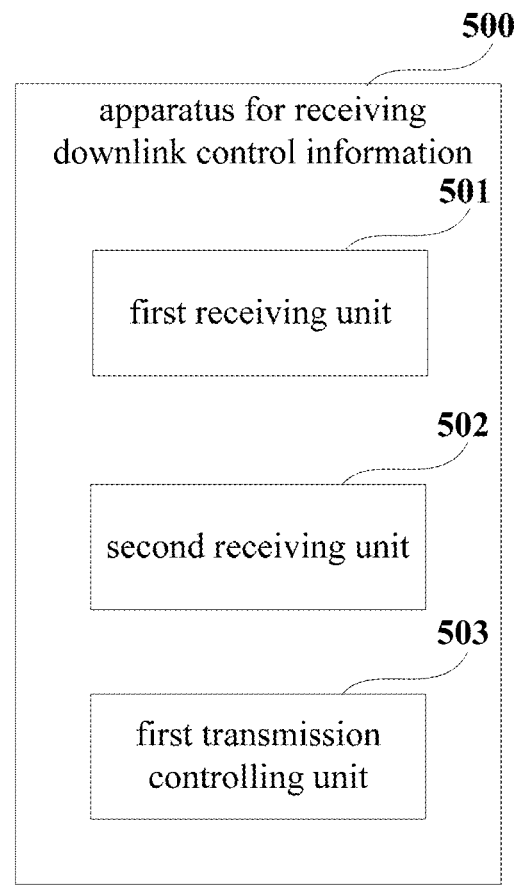
FIG. 5 is a schematic diagram of the apparatus for receiving downlink control information of Embodiment 4 of this disclosure.

FIG. 5 is a schematic diagram of the apparatus for receiving downlink control information (DCI) of Embodiment 4. As shown in FIG. 5, an apparatus for receiving downlink control information 500 includes a first receiving unit 501. The first receiving unit 501 is configured to receive first DCI indicating an interrupted first time-frequency resource used for transmitting uplink data transmitted by a network device, the first DCI at least including a first field indicating a position of the first time-frequency resource.

According to this embodiment, which time-frequency resources carrying uplink data are interrupted by a terminal equipment of a higher priority may be indicated to the terminal equipment. Hence, when the uplink data transmission of the terminal equipment is interrupted, the terminal equipment may be effectively indicated.

In this embodiment, the first DCI is further used to indicate the terminal equipment: not to transmit the uplink data carried by the first time-frequency resource on the first time-frequency resource, or transmit the uplink data carried by the first time-frequency resource at reduced power, or transmit the uplink data carried by the first time-frequency resource in a nonorthogonal multiple access manner.

In this embodiment, a period of the terminal equipment used for monitoring the first DCI is less than or equal to a period of the terminal equipment used for monitoring second DCI, the second DCI being used for indicating the terminal equipment to transmit uplink data on a second time-frequency resource.

In this embodiment, a DCI format of the first DCI is identical to or different from a DCI format of third DCI, the third DCI being used for indicating to the terminal equipment an interrupted third time-frequency resource used for transmitting downlink data.

In this embodiment, when the DCI format of the first DCI is identical to the DCI format of the third DCI, the first DCI is larger than the third DCI by an information field, an information bit in the information field being used for indicating whether currently transmitted DCI is the first DCI or the third DCI.

In this embodiment, when the DCI format of the first DCI is different from the DCI format of the third DCI, the first DCI is UE-specific DCI of the terminal equipment, or the first DCI is UE-group common DCI.

In this embodiment, the first field includes at least one first sub-field, the first sub-field corresponding to a serving cell of the terminal equipment.

In this embodiment, a length of the first sub-field may be a predetermined length, or may be a length configured by the network device via configuration signaling.

In this embodiment, reference may be made to the description in Embodiment 1 of this disclosure for a correspondence between data bits in the first sub-field and the time units in the first time-frequency resource.

For example, when a division manner of a frequency domain of the interrupted first time-frequency resource is that a whole frequency band is taken as a division unit, one or more than one data bits of the first sub-field indicate whether a time unit in the frequency band is interrupted, or one data bit of the first sub-field indicates whether one or more than one time units in the frequency band are interrupted.

For another example, when a division manner of a frequency domain of the interrupted first time-frequency resource is that a part of frequency band in a whole frequency band is taken as a division unit, a frequency domain of the interrupted data transmission resource is divided into more than two partial frequency bands, the first sub-field includes at least two groups of data bits, each group of data bits corresponding to said partial frequency bands, and in the groups of data bits, one or more than one data bits indicate whether one time unit in the partial frequency bands is interrupted, or, one data bit indicates whether one or more than one time units in the partial frequency bands are interrupted.

In this embodiment, as shown in FIG. 5, the apparatus 500 further includes: a second receiving unit 502.

The second receiving unit 502 receives configuration information at least used for configuring the first DCI transmitted by the network device.

In this embodiment, the terminal equipment may receive via higher-layer signaling the configuration information transmitted by the network device.

In this embodiment, the configuration information at least includes first configuration information, the first configuration information being used to configure the first DCI.

In this embodiment, the configuration information may further include at least one piece of the following configuration information:

second configuration information, the second configuration information being used to configure the terminal equipment not to transmit the uplink data carried by the first time-frequency resource, or transmit the uplink data carried by the first time-frequency resource at reduced power, or transmit the uplink data carried by the first time-frequency resource in a nonorthogonal multiple access manner;

third configuration information, the third configuration information being used to configure that the nonorthogonal multiple access manner is sparse code multiple access (SCMA), or multi-user shared access (MUSA), or interweaver division multiple access (IDDMA), or other nonorthogonal multiple access manners;

fourth configuration information, the fourth configuration information being used to configure codewords in nonorthogonal multiple access with signatures being sparse used for distinguishing users, or nonorthogonal codewords, or interleavers, or other codewords for distinguishing signatures of users;

fifth configuration information, the fifth configuration information being used to configure a length of the first sub-field and/or a length of the first field;

sixth configuration information, the sixth configuration information being used to configure that a division manner of the first time-frequency resource indicated by the first sub-field on the frequency domain is in a division unit of a whole frequency band, or in a division unit of a partial frequency band;

seventh configuration information, the seventh configuration information being used to configured that a time unit of the first time-frequency resource indicated by the first sub-field on the time domain is one or more than two slots, or one or more than two non-slots, or one or more than two micro-slots, or one or more than two symbols;

eighth configuration information, the eighth configuration information being used to configure the terminal equipment with a period for monitoring first DCI;

ninth configuration information, the fourth configuration information being used to configure a set of serving cell indices of the terminal equipment;

tenth configuration information, the fourth configuration information being used to configure a position of a first sub-field to which each serving cell of the terminal equipment corresponds in the first field; and eleventh configuration information, the fourth configuration information being used to configure a radio network temporary identifier (RNTI) scrambling the first DCI.

Furthermore, in another implementation, information configured by at least one pieces of the second to the eleventh configuration information may be predetermined information, hence, the terminal equipment may be configured with no need of configuration information.

As shown in FIG. 5, the apparatus may further include:

a first transmission controlling unit 503 configured to control the terminal equipment not to transmit the uplink data, or transmit the uplink data at reduced power, or transmit the uplink data in a nonorthogonal multiple access manner, on the at least overlapped time-frequency resources.

In one implementation, the first transmission controlling unit 503 controls the terminal equipment not to transmit the uplink data, or transmit the uplink data at reduced power, or transmit the uplink data in a nonorthogonal multiple access manner, on overlapped time-frequency resources.

In another implementation, the first transmission controlling unit 503 controls the terminal equipment not to transmit the uplink data, or transmit the uplink data at reduced power, or transmit the uplink data in a nonorthogonal multiple access manner, on the time-frequency resource.

In a further implementation, the first transmission controlling unit 503 controls the terminal equipment not to transmit the uplink data, or transmit the uplink data at reduced power, or transmit the uplink data in a nonorthogonal multiple access manner, on the time-frequency resource after the first DCI is received.

According to this embodiment, which time-frequency resources carrying uplink data are interrupted by a terminal equipment of a higher priority may be indicated to the terminal equipment. Hence, when the uplink data transmission of the terminal equipment is interrupted, the terminal equipment may be effectively indicated.

Embodiment 5

Embodiment 5 provides a network device. As a principle of the network device for solving problems is similar to that of the method in Embodiment 1, reference may be made to the implementation of the method in Embodiment 1 for implementation of this network device, with identical contents being going to be described herein any further.

Figure 6:
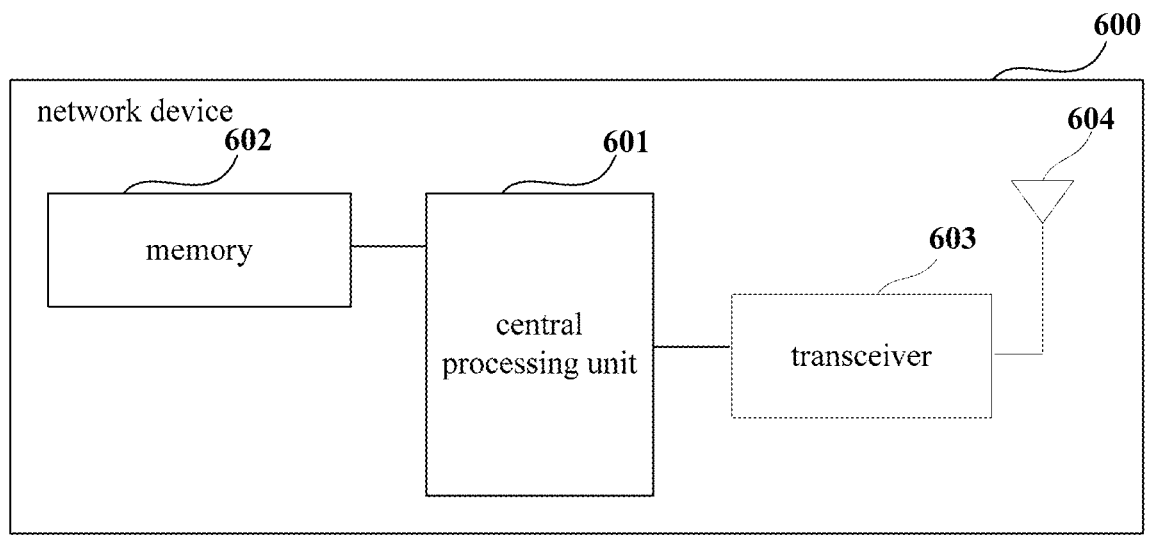
FIG. 6 is a schematic diagram of a structure of the network device of Embodiment 5 of this disclosure.

FIG. 6 is a schematic diagram of a structure of the network device of the embodiment of this disclosure. As shown in FIG. 6, a network device 600 may include a central processing unit (CPU) 601 and a memory 602, the memory 602 being coupled to the central processing unit 601. The memory 602 may store various data, and furthermore, it may store a program for data processing, and execute the program under control of the central processing unit 601.

In one implementation, the functions of the apparatus 400 may be integrated into the central processing unit 601. The central processing unit 601 may be configured to carry out the method for transmitting downlink control information (DCI) described in Embodiment 1.

For example, the central processing unit 601 may be configured to perform control, such that the network device 600 carries out the method described in Embodiment 1.

Furthermore, reference may be made to Embodiment 1 for other configuration methods of the central processing unit 601, which shall not be described herein any further.

In another implementation, the apparatus 400 and the central processing unit 601 may be configured separately; for example, the apparatus 400 may be configured as a chip connected to the central processing unit 601, such as units shown in FIG. 6, and the functions of the apparatus 400 are executed under control of the central processing unit 601.

Furthermore, as shown in FIG. 6, the network device 600 may include a transceiver 603, and an antenna 604, etc. Functions of the above components are similar to those in the related art, and shall not be described herein any further. It should be noted that the network device 600 does not necessarily include all the parts shown in FIG. 6. Furthermore, the network device 600 may include parts not shown in FIG. 6, and the related art may be referred to.

According to this embodiment, which time-frequency resources carrying uplink data are interrupted by a terminal equipment of a higher priority may be indicated to the terminal equipment. Hence, when the uplink data transmission of the terminal equipment is interrupted, the terminal equipment may be effectively indicated.

Embodiment 6

Embodiment 6 provides a terminal equipment. As a principle of the terminal equipment for solving problems is similar to that of the method in Embodiment 2, reference may be made to the implementation of the method in Embodiment 2 for implementation of this terminal equipment, with identical contents being going to be described herein any further.

Figure 7:
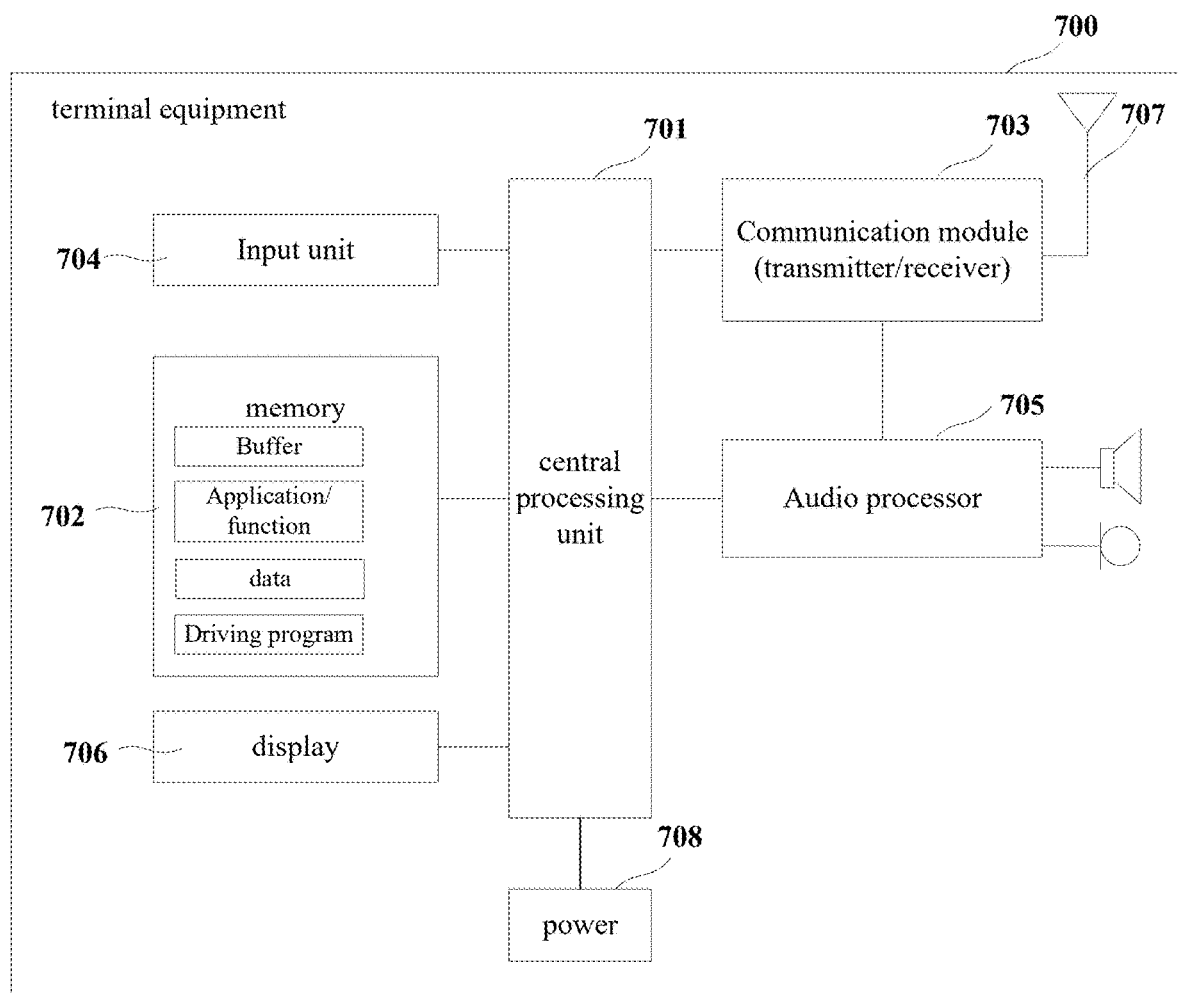
FIG. 7 is a schematic diagram of a structure of the terminal equipment of Embodiment 6 of this disclosure.

FIG. 7 is a schematic diagram of a structure of the terminal equipment of the embodiment of this disclosure. As shown in FIG. 7, a terminal equipment 700 may include a central processing unit (CPU) 701 and a memory 702, the memory 702 being coupled to the central processing unit 701. The memory 702 may store various data, and furthermore, it may store a program for data processing, and execute the program under control of the central processing unit 701, so as to indicate to the terminal equipment according to received signaling.

In one implementation, the functions of the apparatus 500 in Embodiment 4 may be integrated into the central processing unit 701 of the terminal equipment 700. The central processing unit 701 may be configured to carry out the method for receiving downlink control information (DCI) described in Embodiment 2, indicate to the terminal equipment according to received information.

For example, the central processing unit 701 may be configured to perform control, such that the terminal equipment 700 carries out the method described in Embodiment 2.

Furthermore, reference may be made to Embodiment 2 for other configuration methods of the central processing unit 701, which shall not be described herein any further.

In another implementation, the apparatus 500 and the central processing unit 701 may be configured separately; for example, the apparatus 500 may be configured as a chip connected to the central processing unit 701, such as units shown in FIG. 7, and the functions of the apparatus 500 are executed under control of the central processing unit 701.

According to this embodiment, which time-frequency resources carrying uplink data are interrupted by a terminal equipment of a higher priority may be indicated to the terminal equipment. Hence, when the uplink data transmission of the terminal equipment is interrupted, the terminal equipment may be effectively indicated.

Embodiment 7

Embodiment 7 of this disclosure provides a communication system, including at least the network device 600 in Embodiment 5 and the terminal equipment 700 in Embodiment 6. Contents of Embodiment 5 and Embodiment 6 are incorporated herein, and shall not be described herein any further.

A workflow that the first time-frequency resource is interrupted is indicated to the terminal equipment 700 in the communication system including the network device 600 and the terminal equipment 700 shall be described below by taking an implementation as an example.

Figure 8:
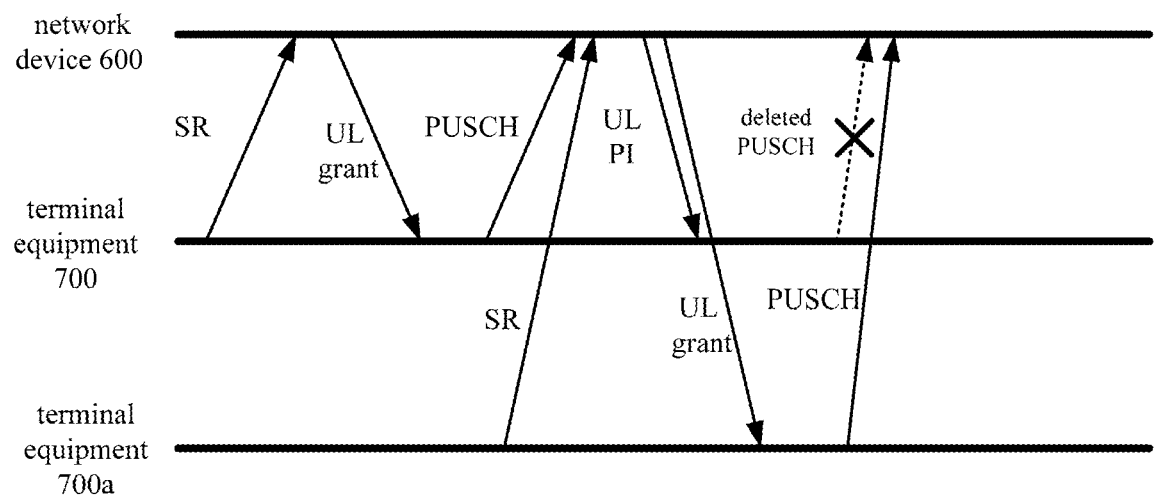
FIG. 8 is a workflow of the communication system of Embodiment 7 of this disclosure.

FIG. 8 is a schematic diagram of the workflow.

As shown in FIG. 8, in this embodiment, the DCI format of the first DCI is different from the DCI format of the third DCI, the interrupted time-frequency resource is indicated in the frequency domain as per the entire frequency band, and a data bit of the first sub-field of the first DCI is of a fixed length. As shown in FIG. 8, the workflow is as follows:

step 1: a terminal equipment 700a of a high priority transmits a scheduling request (SR) to the network device 600;

step 2: the network device 600 transmits configuration information to the terminal equipment 700 of a low priority that is using a resource shared by the terminal equipment 700a via higher-layer signaling, the terminal equipment 700 is able to be configured as follows according to the configuration information:

1) configuring the first DCI via higher-layer signaling (such as, Uplink-Preemption);
2) configuring via higher-layer signaling (such as int-Uplink-RNTI) a radio network temporary identifier used for scrambling the first DCI;
3) configuring via higher-layer signaling (such as INT-cell-to-INT) a set of indices of serving cells; for example, the serving cells are cell 1 and cell 2, and a set thereof is {cell 1, cell 2};
4) configuring via higher-layer signaling (such as cell-to-INT) a position of a first sub-field to which each serving cell of the terminal equipment corresponds in the first field, mapping between serving cells in the set of serving cells and first sub-fields, i.e. {cell 1↔preemption indication 1, cell 2↔preemption indication 2}; where, preemption indication 1 and preemption indication 2 are both first sub-fields;
5) configuring via higher-layer signaling (such as INT-DCI-payload-length) that a size of a payload of a DCI format is of 28 bits;
6) configuring via higher-layer signaling (such as INT-TF-unit) a division manner {0,0} of an interrupted time-frequency resource in the frequency domain for each serving cell in the set of serving cells; where, {0,0} denotes that a whole frequency band is taken as a division unit;
7) configuring via higher-layer signaling (such as Monitoring-periodicity-PDCCH-INT) that a detection period of the first DCI is that detection is performed every two symbols;
8) configuring via higher-layer signaling (such as INT-time-length) that a length in time in the interrupted time-frequency resource indicated by the first DCI is 4 symbols; and
9) configuring via higher-layer signaling (such as UL-preemption-method) that an interrupted manner of the terminal equipment is that it does not transmit uplink data on the indicated first time-frequency resource;

step 3: the network device 600 transmits the first DCI to the terminal equipment 700 with UE-group common DCI in a downlink control channel, where in the first DCI:

1) each cell indicates which symbols are interrupted on N time units after n+N3 by using a fixed bit length Lbit; where, n is a time unit when an uplink interruption indication is detected, and N3 is a needed time unit during the terminal equipment 700 demodulates an uplink preemption indication and prepares for cancelling or delaying corresponding time-frequency resource data; here, let L=14 be a predetermined value, N3=4, N=4, and the time unit is a symbol;
2) four consecutive bits are used to indicate whether a 0-th symbol and first symbol in the above four symbols are interrupted, and three consecutive bits are used to indicate whether a second symbol and third symbol in the above four symbols are interrupted;
3) suppose a 0-th, 1st and 3rd symbols in cell 1 are interrupted, values of the 14 bits of the first sub-field in the first DCI corresponding to cell1 are 11111111111000; suppose the 2nd and 3rd symbols in cell 2 are interrupted, t values of the 14 bits of the first sub-field in the first DCI corresponding to cell2 are 00001111111000; and the first sub-field and the second sub-field have data of total 28 bits; and
4) int-Uplink-RNTI configured by the higher layer is used to scramble the 28 bits of data to be transmitted;

step 4: the network device 600 transmits an uplink grant (UL grant) to the terminal equipment 700a;

step 5: the terminal equipment 700 of a low priority performs blind detection on the downlink control information in the monitoring period:

the terminal equipment 700 does not transmit uplink data within four symbols starting from an (n+4)-th symbol on the first time-frequency resource indicated by the first sub-field (such as UL preemption indication) of the first DCI according to the detected first DCI in a method configured via higher layer signaling; where n is a symbol subscript of the detected first DCI, and a time unit at which the first DCI is detected may be determined according to the symbol subscript; in this embodiment, the first time-frequency resource is entirely contained in the second time-frequency resource;

step 6: the terminal equipment 700 demodulates the UL grant, and then transmits uplink data information.

According to this embodiment, which time-frequency resources carrying uplink data are interrupted by a terminal equipment of a higher priority may be indicated to the terminal equipment via the downlink control information, hence, when the uplink data transmission of the terminal equipment is interrupted, the terminal equipment may be effectively indicated.

An embodiment of this disclosure provides a computer readable storage medium, including a computer readable program code, which will cause an apparatus for transmitting downlink control information (DCI) or a network device to carry out the method for transmitting downlink control information (DCI) described in Embodiment 1.

An embodiment of the present disclosure provides a computer readable program code, which, when executed in an apparatus for transmitting downlink control information (DCI) or a network device, will cause the apparatus for transmitting downlink control information (DCI) or the network device to carry out the method for transmitting downlink control information (DCI) described in Embodiment 1.

An embodiment of this disclosure provides a computer readable storage medium, including a computer readable program code, which will cause an apparatus for receiving downlink control information (DCI) or a terminal equipment to carry out the method for receiving downlink control information (DCI) described in Embodiment 2.

An embodiment of the present disclosure provides a computer readable program code, which, when executed in an apparatus for receiving downlink control information (DCI) or a terminal equipment or a terminal equipment, will cause the apparatus for receiving downlink control information (DCI) or a terminal equipment or the terminal equipment to carry out the method for receiving downlink control information (DCI) described in Embodiment 2.

Embodiment 8

The embodiment of this disclosure provides a method for transmitting downlink control information (DCI), which may be carried out by a network device.

Figure 9:
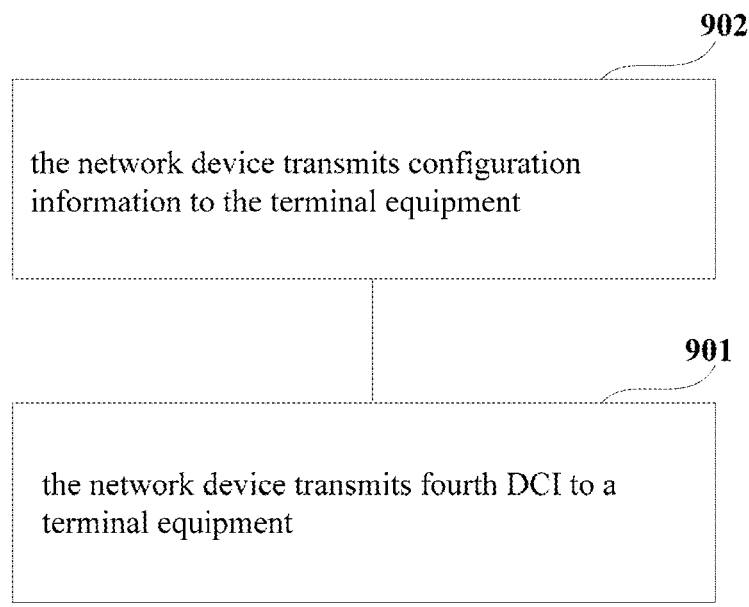
FIG. 9 is a schematic diagram of the method for transmitting downlink control information of Embodiment 8 of this disclosure.

FIG. 9 is a schematic diagram of the method for transmitting downlink control information (DCI) of this embodiment. As shown in FIG. 9, the method includes:

step 901: the network device transmits fourth DCI to a terminal equipment, the fourth DCI being used for indicating an interrupted first time-frequency resource used for transmitting uplink data and an interrupted third time-frequency resource used for transmitting downlink data, the fourth DCI at least including a second field indicating a position of the first time-frequency resource and a position of the third time-frequency resource.

According to this embodiment, which time-frequency resources carrying uplink data are interrupted by a terminal equipment of a higher priority and which time-frequency resources carrying downlink data are interrupted by the terminal equipment of a higher priority may be indicated to the terminal equipment via the downlink control information, hence, when the uplink data transmission and downlink data transmission of the terminal equipment are interrupted, the terminal equipment may be jointly indicated.

In this embodiment, that the first time-frequency resource or the third time-frequency resource is interrupted, which may also be referred to as preempted, means that when the terminal equipment transmits uplink data via the first time-frequency resource or transmits downlink data via the third time-frequency resource, the terminal equipment is interrupted by a terminal equipment of higher priority.

In this embodiment, when the first time-frequency resource of the terminal equipment is interrupted, the terminal equipment has a lower priority on the first time-frequency resource. An implementation mode of the lower priority may be, for example, that the terminal equipment does not transmit the uplink data carried by the first time-frequency resource on the first time-frequency resource, or transmits the uplink data carried by the first time-frequency resource at reduced power, or transmit the uplink data carried by the first time-frequency resource in a nonorthogonal multiple access manner. That transmits the uplink data at reduced power refers to that the terminal equipment reduces transmission power relative to normal transmission power, and as the transmission power is lowered, the uplink data may be transmitted at power lower than that of the terminal equipment of a higher priority.

In this embodiment, an expression mode of the lower priority may be indicated by the fourth DCI to the terminal equipment, or may be preset.

In this embodiment, a period for monitoring the fourth DCI configured by the network device for the terminal equipment may be less than or equal to a period for monitoring the second DCI configured by the network device for the terminal equipment, the second DCI being used to indicate that the terminal equipment transmit the uplink data on the second time-frequency resource.

In this embodiment, the third time-frequency resource may be earlier or later in time than a time-frequency resource where the fourth DCI is located, and the first time-frequency resource may be later in time than the time-frequency resource where the fourth DCI is located.

In this embodiment, a DCI format of the fourth DCI is identical to or different from a DCI format of third DCI, wherein the third DCI may be used to separately indicate to the terminal equipment an interrupted third time-frequency resource used for transmitting downlink data. Reference may be made to Embodiment 1 for description of the third DCI, which shall not be repeated in this embodiment.

In this embodiment, when the DCI format of the fourth DCI and the DCI format of the third DCI are identical, the DCI format of the fourth DCI may be added with an information field relative to the format of the third DCI, an information bit in the information field is used to indicate whether currently transmitted DCI is the fourth DCI or the third DCI.

In this embodiment, when the DCI format of the fourth DCI is different from the DCI format of the third DCI, the fourth DCI is UE-specific DCI of the terminal equipment, or the fourth DCI is UE-group common DCI.

In this embodiment, the second field of the fourth DCI may include at least one second sub-field, the at least one second sub-field corresponding to a serving cell of the terminal equipment.

In this embodiment, a length of the second sub-field is predetermined.

In this embodiment, the second sub-field may include a first part of data bits and a second part of data bits; the first part of data bits correspond to the first time-frequency resource and used for indicating a position of the first time-frequency resource where the uplink data are interrupted, and second part of data bits correspond to the third time-frequency resource and used for indicating a position of the third time-frequency resource where the downlink data are interrupted.

In this embodiment, the first part of data bits and the second part of data bits may not be divided in a chronological order, and may be respectively nonconsecutive in time, for example, they may be interspersed in sequence.

In an embodiment, the network device indicates which time-frequency resources are interrupted via the data bits of the second sub-field, and may not indicate whether the interrupted time-frequency resources are used for transmitting uplink data or downlink data. When the terminal equipment receives the fourth DCI, whether the uplink data are interfered or the downlink data are interfered may be determined according to a state of the terminal equipment in receiving the fourth DCI. For example, when the terminal equipment receives the fourth DCI, the uplink data are being transmitted, or the uplink data are to be transmitted, and a part of time-frequency resources in the interrupted time-frequency resources indicated by the fourth DCI overlap with uplink time-frequency resources allocated by the terminal equipment, in which case the terminal equipment may take the overlapped time-frequency resources as the interrupted uplink time-frequency resources, i.e. the interrupted first time-frequency resources used for transmitting uplink data indicated by the fourth DCI, the data bits used to indicate the part of the time-frequency resources in the fourth DCI are the first part of data bits.

In addition, in another implementation, the terminal equipment may also be indicated which time-frequency resources in the interrupted time-frequency resources indicated by the data bits of the second sub-field of the fourth DCI are used for transmitting uplink data and which time-frequency resources are used for transmitting downlink data.

In this embodiment, a division manner of a frequency domain of the interrupted first time-frequency resource and a division manner of a frequency domain of the interrupted third time-frequency resource may be identical or different. For example, the division manners of the frequency domains of the first time-frequency resource and the third time-frequency resource may be that a whole frequency band is taken as a division unit, or the division manners of the frequency domains of the first time-frequency resource and the third time-frequency resource may be that a part of frequency band is taken as a division unit, or the division manners of the frequency domains of the first time-frequency resource and the third time-frequency resource may be that a part of frequency band of one of them is taken as a division unit and a whole frequency band of the other of them is taken as a division unit.

In this embodiment, when the division manner/division manners of the frequency domain/frequency domains of the interrupted first time-frequency resource and/or the interrupted third time-frequency resource is/are that a whole frequency band is taken as a division unit, one or more than one data bits in the first part of data bits and/or the second part of data bits in the second sub-field indicate whether a time unit in the frequency band is interrupted, or one data bit indicates whether one or more than one time units in the frequency band are interrupted.

In this embodiment, when the division manner/division manners of the frequency domain/frequency domains of the interrupted first time-frequency resource and/or the interrupted third time-frequency resource is/are that a part of frequency band is taken as a division unit, a frequency domain of the interrupted data transmission resource is divided into two or more than two partial frequency bands, the first part of data bits and/or the second part of data bits in the second sub-field include at least two groups of data bits, each group of data bits corresponding to one of the partial frequency bands, and in the groups of data bits, one or more than one data bits indicate whether one time unit in the partial frequency bands is interrupted, or, one data bit indicates whether one or more than one time units in the partial frequency bands are interrupted.

In this embodiment, description of the first part of the data bits and the second part of the data bits, the correspondence between each data bit and the time unit can be referred to the description of L (or Lv) and N in the first embodiment.

In this embodiment, as shown in FIG. 9, the method further includes:

step 902: the network device transmits configuration information to the terminal equipment.

In this embodiment, the configuration information at least includes twelfth configuration information used for configuring the fourth DCI.

In this embodiment, the configuration information may further include at least one piece of the following configuration information:

thirteenth configuration information used for configuring that the terminal equipment does not transmit the uplink data carried by the first time-frequency resource, or transmits the uplink data carried by the first time-frequency resource at reduced power, or transmits the uplink data carried by the first time-frequency resource in a nonorthogonal multiple access manner;

fourteenth configuration information used for configuring that a manner of nonorthogonal multiple access of the terminal equipment is sparse code multiple access (SCMA), or multi-user shared access (MUSA), or interweaver division multiple access (IDMA), or other manners of nonorthogonal multiple access;

fifteenth configuration information used for configuring that signatures used for distinguishing users in nonorthogonal multiple access of the terminal equipment are sparse codewords, or nonorthogonal codewords, or interweavers, or other signatures used for distinguishing users;

sixteenth configuration information used for configuring a length of the second field and/or a length of the second sub-field;

seventeenth configuration information used for configuring for the terminal equipment that a division manner of the first time-frequency resource indicated by the second sub-field in the frequency domain is a whole frequency band, or a part of frequency band;

eighteenth configuration information used for configuring for the terminal equipment that a division granularity of the third time-frequency resource indicated by the second sub-field in the frequency domain is taking a whole frequency band as a division unit, or taking a part of frequency band as a division unit;

nineteenth configuration information used for configuring for the terminal equipment that a time unit of the first time-frequency resource and/or the third time-frequency resource indicated by the second sub-field is one or two or more than two slots, or one or two or more than two non-slots, or one or two or more than two mini-slots, or one or two or more than two symbols;

twentieth configuration information used for configuring a period for monitoring the fourth DCI for the terminal equipment;

twenty-first configuration information used for configuring a set of serving cell indices of the terminal equipment;

twenty-second configuration information used for configuring a position of a second sub-field to which each serving cell of the terminal equipment corresponds in the second field; and twenty-third configuration information used for configuring a radio network temporary identifier (RNTI) scrambling the fourth DCI.

According to this embodiment, which time-frequency resources carrying uplink data are interrupted by a terminal equipment of a higher priority and which time-frequency resources carrying downlink data are interrupted by the terminal equipment of a higher priority may be indicated to the terminal equipment via the downlink control information, hence, when the uplink data transmission and downlink data transmission of the terminal equipment are interrupted, the terminal equipment may be jointly indicated.

Embodiment 9

The embodiment of this disclosure provides a method for receiving downlink control information (DCI), which may be carried out by a terminal equipment.

Figure 10:
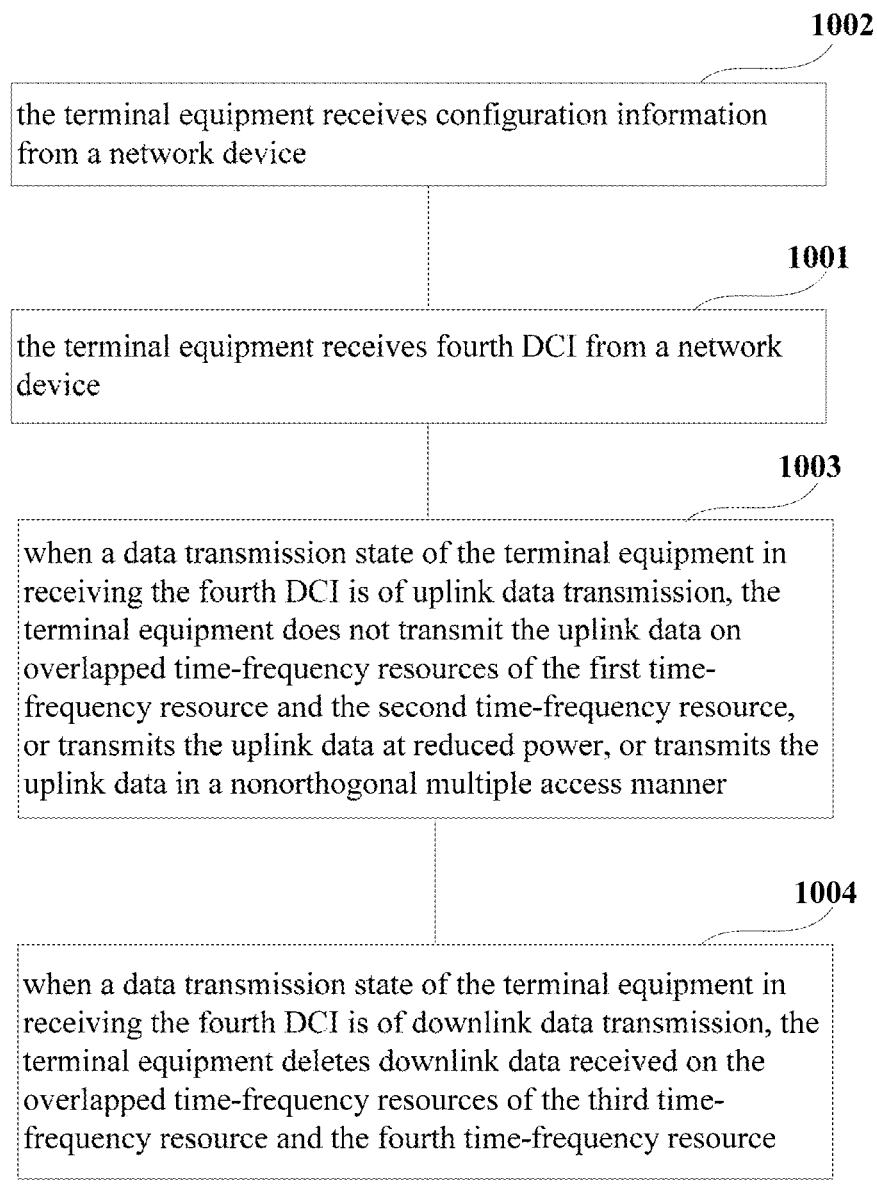
FIG. 10 is a schematic diagram of the method for receiving downlink control information of Embodiment 9 of this disclosure.

FIG. 10 is a schematic diagram of the method for receiving downlink control information (DCI) of this embodiment. As shown in FIG. 10, the method includes:

step 1001: the terminal equipment receives fourth DCI from a network device, the fourth DCI being used for indicating an interrupted first time-frequency resource used for transmitting uplink data and an interrupted third time-frequency resource used for transmitting downlink data, the fourth DCI at least including a second field indicating a position of the first time-frequency resource and a position of the third time-frequency resource.

In this embodiment, reference may be made to Embodiment 8 for description of the fourth DCI, which shall not be repeated herein any further.

As shown in FIG. 10, the method further includes:

step 1002: the terminal equipment receives configuration information from a network device.

Reference may be made to Embodiment 8 for description of the configuration information, which shall not be repeated herein any further.

As shown in FIG. 10, the method further includes:

step 1003: when a data transmission state of the terminal equipment in receiving the fourth DCI is of uplink data transmission, the terminal equipment does not transmit the uplink data on overlapped time-frequency resources of the first time-frequency resource and the second time-frequency resource, or transmits the uplink data at reduced power, or transmits the uplink data in a nonorthogonal multiple access manner.

In one implementation, the terminal equipment may not transmit the uplink data, or transmit the uplink data at reduced power, or transmit the uplink data in a nonorthogonal multiple access manner, on the overlapped time-frequency resources;

in another implementation, the terminal equipment does not transmit the uplink data, or transmits the uplink data at reduced power, or transmits the uplink data in a nonorthogonal multiple access manner, on the second time-frequency resource; that is, the priority of the terminal equipment is not only reduced on the overlapped time-frequency resources, but also on the whole second time-frequency resource; and this case is applicable to a situation where the terminal equipment has not started to transmit data on the second time-frequency resource when the first DCI is received;

in a further implementation, the terminal equipment does not transmit the uplink data, or transmits the uplink data at reduced power, or transmits the uplink data in a nonorthogonal multiple access manner, on the second time-frequency resource after the first DCI is received; and this case is applicable to a situation where the terminal equipment has transmitted data on the second time-frequency resource before the first DCI is received.

As shown in FIG. 10, the method further includes:

step 1004: when a data transmission state of the terminal equipment in receiving the fourth DCI is of downlink data transmission, the terminal equipment deletes downlink data received on the overlapped time-frequency resources of the third time-frequency resource and the fourth time-frequency resource.

The fourth time-frequency resource is a time-frequency resource used by the terminal equipment for transmitting downlink data.

According to this embodiment, which time-frequency resources carrying uplink data are interrupted by a terminal equipment of a higher priority and which time-frequency resources carrying downlink data are interrupted by the terminal equipment of a higher priority may be indicated to the terminal equipment via the downlink control information, hence, when the uplink data transmission and downlink data transmission of the terminal equipment are interrupted, the terminal equipment may be jointly indicated.

Embodiment 10

Embodiment 10 of this disclosure provides an apparatus for transmitting downlink control information (DCI), applicable to a network device. As a principle of the apparatus for solving problems is similar to that of the method in Embodiment 8, reference may be made to the implementation of the method in Embodiment 8 for implementation of this apparatus, with identical contents being going to be described herein any further.

Figure 11:
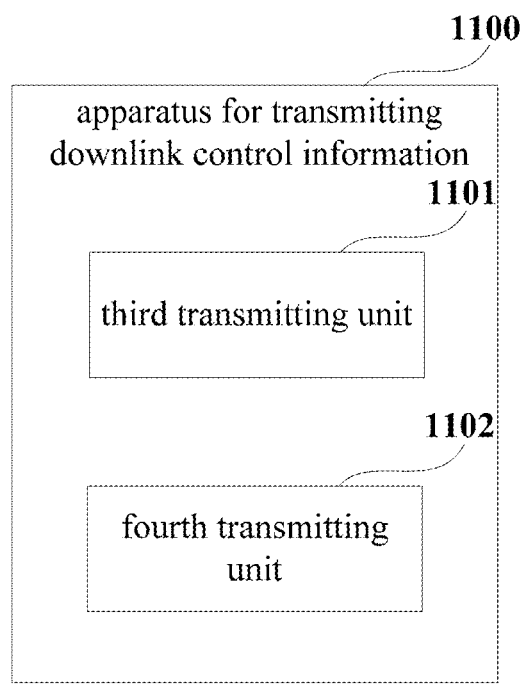
FIG. 11 is a schematic diagram of the apparatus for transmitting downlink control information of Embodiment 10 of this disclosure.

FIG. 11 is a schematic diagram of the apparatus for transmitting downlink control information (DCI) of this embodiment. As shown in FIG. 11, an apparatus for transmitting downlink control information 1100 includes a third transmitting unit 1101 configured to transmit fourth DCI to a terminal equipment, the fourth DCI being used for indicating an interrupted first time-frequency resource used for transmitting uplink data and an interrupted third time-frequency resource used for transmitting downlink data, the fourth DCI at least including a second field indicating a position of the first time-frequency resource and a position of the third time-frequency resource.

As shown in FIG. 11, the apparatus 1100 further includes a fourth transmitting unit 1102 configured to transmit to the terminal equipment configuration information at least used for configuring the fourth DCI.

Reference may be made to corresponding steps in Embodiment 8 for the units of the apparatus 1100, which shall not be repeated herein any further.

According to this embodiment, which time-frequency resources carrying uplink data are interrupted by a terminal equipment of a higher priority and which time-frequency resources carrying downlink data are interrupted by the terminal equipment of a higher priority may be indicated to the terminal equipment via the downlink control information, hence, when the uplink data transmission and downlink data transmission of the terminal equipment are interrupted, the terminal equipment may be jointly indicated.

Embodiment 11

Embodiment 11 of this disclosure provides an apparatus for receiving downlink control information (DCI), applicable to a terminal equipment. As a principle of the apparatus for solving problems is similar to that of the method in Embodiment 9, reference may be made to the implementation of the method in Embodiment 9 for implementation of this apparatus, with identical contents being going to be described herein any further.

Figure 12:
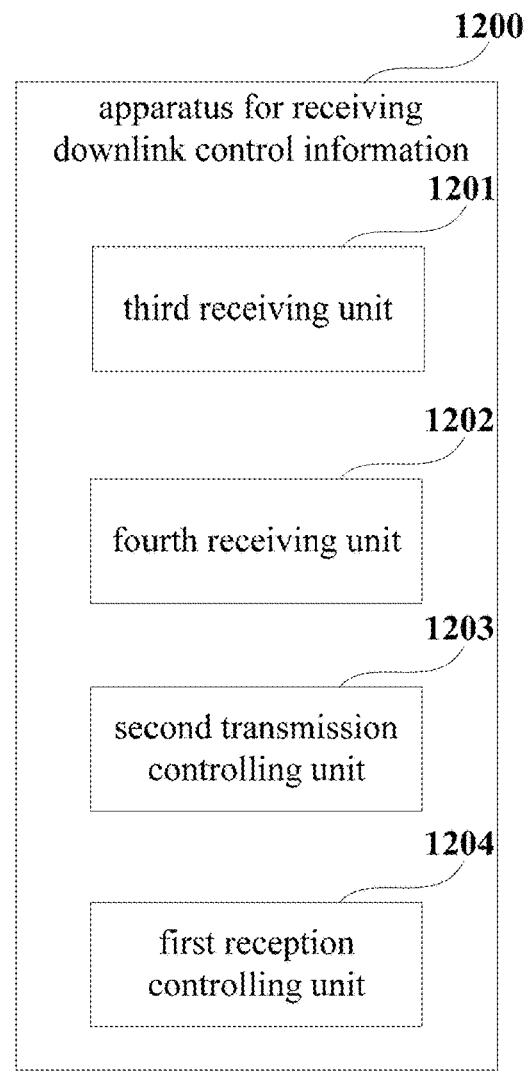
FIG. 12 is a schematic diagram of the apparatus for receiving downlink control information of Embodiment 11 of this disclosure.

FIG. 12 is a schematic diagram of the apparatus for receiving downlink control information (DCI) of this embodiment. As shown in FIG. 12, an apparatus for receiving downlink control information 1200 includes a third receiving unit 1201 configured to receive fourth DCI from a network device, the fourth DCI being used for indicating an interrupted first time-frequency resource used for transmitting uplink data and an interrupted third time-frequency resource used for transmitting downlink data, the fourth DCI at least including a second field indicating a position of the first time-frequency resource and a position of the third time-frequency resource.

As shown in FIG. 12, the apparatus 1200 may further include a fourth receiving unit 1202 configured to receive configuration information from the network device.

As shown in FIG. 12, the apparatus 1200 may further include a second transmission controlling unit 1203 configured to, when a data transmission status of the terminal equipment in receiving the fourth DCI is uplink data transmission, control the terminal equipment not to transmit the uplink data, or transmit the uplink data at reduced power, or transmit the uplink data in a nonorthogonal multiple access manner, on the at least overlapped time-frequency resources.

In one implementation, the second transmission controlling unit 1203 controls the terminal equipment not to transmit the uplink data, or transmit the uplink data at reduced power, or transmit the uplink data in a nonorthogonal multiple access manner, on the overlapped time-frequency resources; in another implementation, the second transmission controlling unit 1203 controls the terminal equipment not to transmit the uplink data, or transmits the uplink data at reduced power, or transmits the uplink data in a nonorthogonal multiple access manner, on the second time-frequency resource; in a further implementation, the second transmission controlling unit 1203 controls the terminal equipment not to transmit the uplink data, or transmit the uplink data at reduced power, or transmit the uplink data in a nonorthogonal multiple access manner, on the second time-frequency resource after the first DCI is received.

As shown in FIG. 12, the apparatus 1200 may further include a first reception controlling unit 1204 configured to, when a data transmission state of the terminal equipment in receiving the fourth DCI is of downlink data transmission, control the terminal equipment to delete downlink data received on the overlapped time-frequency resources.

Reference may be made to corresponding steps in Embodiment 9 for the units of the apparatus 1200, which shall not be repeated herein any further.

According to this embodiment, which time-frequency resources carrying uplink data are interrupted by a terminal equipment of a higher priority and which time-frequency resources carrying downlink data are interrupted by the terminal equipment of a higher priority may be indicated to the terminal equipment via the downlink control information, hence, when the uplink data transmission and downlink data transmission of the terminal equipment are interrupted, the terminal equipment may be jointly indicated.

Embodiment 12

Embodiment 12 provides a network device. As a principle of the network device for solving problems is similar to that of the method in Embodiment 8, reference may be made to the implementation of the method in Embodiment 8 for implementation of this network device, with identical contents being going to be described herein any further.

Figure 13:
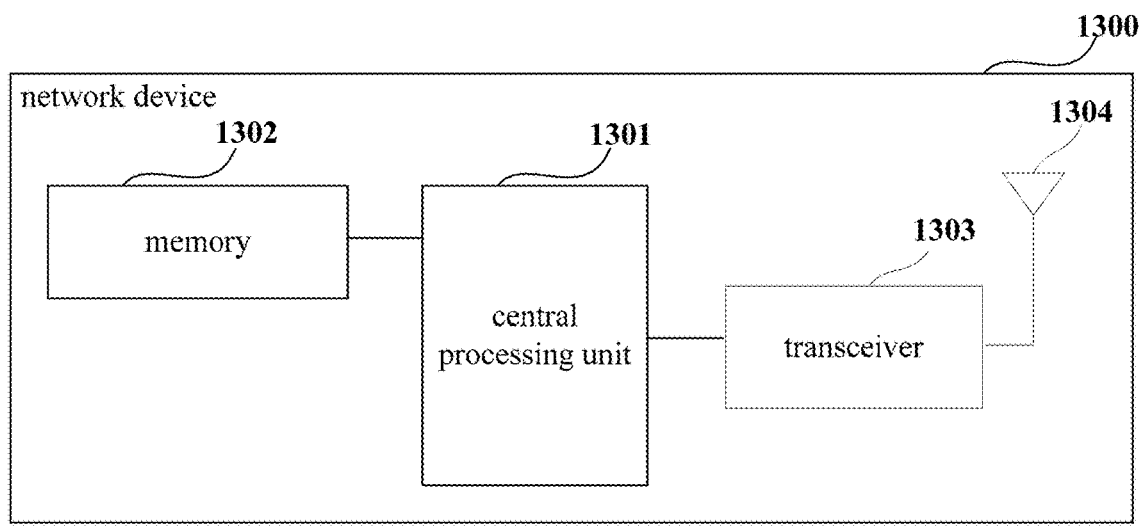
FIG. 13 is a schematic diagram of a structure of the network device of Embodiment 12 of this disclosure.

FIG. 13 is a schematic diagram of a structure of the network device of the embodiment of this disclosure. As shown in FIG. 13, a network device 1300 may include a central processing unit (CPU) 1301 and a memory 1302, the memory 1302 being coupled to the central processing unit 1301. The memory 1302 may store various data, and furthermore, it may store a program for data processing, and execute the program under control of the central processing unit 1301.

In one implementation, the functions of the apparatus 1100 in Embodiment 10 may be integrated into the central processing unit 1301. The central processing unit 1301 may be configured to carry out the method described in Embodiment 8.

For example, the central processing unit 1301 may be configured to perform control, such that the network device 1300 carries out the method described in Embodiment 8.

Furthermore, reference may be made to Embodiment 8 for other configuration methods of the central processing unit 1301, which shall not be described herein any further.

In another implementation, the apparatus 1100 and the central processing unit 1301 may be configured separately; for example, the apparatus 1100 may be configured as a chip connected to the central processing unit 1301, such as units shown in FIG. 13, and the functions of the apparatus 1100 are executed under control of the central processing unit 1301.

Furthermore, as shown in FIG. 13, the network device 1300 may include a transceiver 1303, an antenna 1304, etc. Functions of the above components are similar to those in the related art, and shall not be described herein any further. It should be noted that the network device 1300 does not necessarily include all the parts shown in FIG. 13. Furthermore, the network device 1300 may include parts not shown in FIG. 13, and the related art may be referred to.

According to this embodiment, which time-frequency resources carrying uplink data are interrupted by a terminal equipment of a higher priority and which time-frequency resources carrying downlink data are interrupted by the terminal equipment of a higher priority may be indicated to the terminal equipment via the downlink control information, hence, when the uplink data transmission and downlink data transmission of the terminal equipment are interrupted, the terminal equipment may be jointly indicated.

Embodiment 13

Embodiment 13 provides a terminal equipment. As a principle of the terminal equipment for solving problems is similar to that of the method in Embodiment 9, reference may be made to the implementation of the method in Embodiment 9 for implementation of this terminal equipment, with identical contents being going to be described herein any further.

Figure 14:
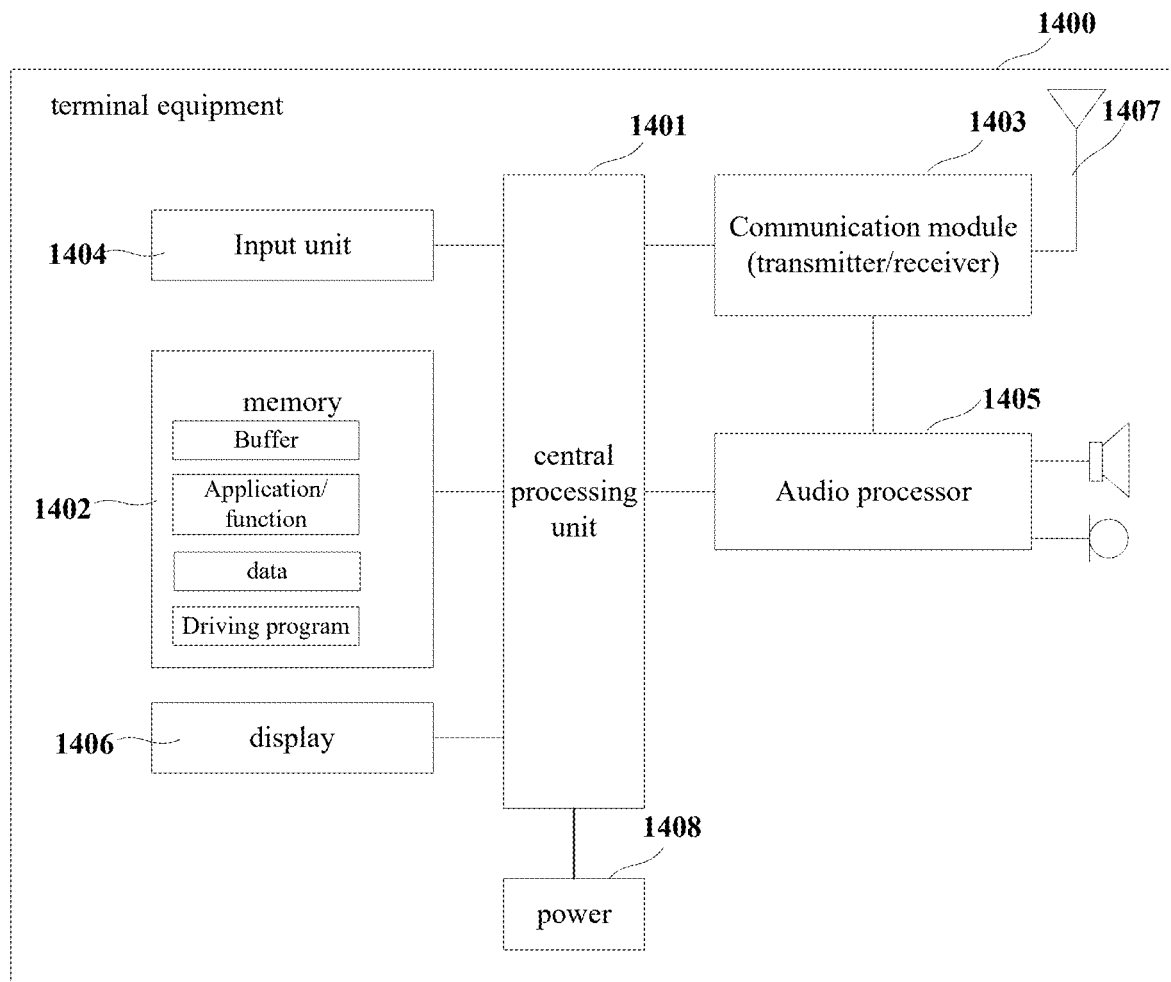
FIG. 14 is a schematic diagram of a structure of the terminal equipment of Embodiment 13 of this disclosure.

FIG. 14 is a schematic diagram of a structure of the terminal equipment of the embodiment of this disclosure. As shown in FIG. 14, a terminal equipment 1400 may include a central processing unit (CPU) 1401 and a memory 1402, the memory 1402 being coupled to the central processing unit 1401. The memory 1402 may store various data, and furthermore, it may store a program for data processing, and execute the program under control of the central processing unit 1401, so as to indicate to the terminal equipment according to received signaling.

In one implementation, the functions of the apparatus 1200 may be integrated into the central processing unit 1401. The central processing unit 1401 may be configured to carry out the method described in Embodiment 9.

For example, the central processing unit 1401 may be configured to perform control, such that the terminal equipment 1400 carries out the method in Embodiment 9.

Furthermore, reference may be made to Embodiment 9 for other configuration methods of the central processing unit 1401, which shall not be described herein any further.

In another implementation, the apparatus 1200 and the central processing unit 1401 may be configured separately; for example, the apparatus 1200 may be configured as a chip connected to the central processing unit 1401, such as units shown in FIG. 14, and the functions of the apparatus 1200 are executed under control of the central processing unit 1401.

Furthermore, as shown in FIG. 14, the terminal equipment 1400 may include a communication module 1403, and an input unit 1404, etc. Functions of the above components are similar to those in the related art, and shall not be described herein any further. It should be noted that the terminal equipment 1400 does not necessarily include all the parts shown in FIG. 14. Furthermore, the terminal equipment 1400 may include parts not shown in FIG. 14, and the related art may be referred to.

According to this embodiment, which time-frequency resources carrying uplink data are interrupted by a terminal equipment of a higher priority and which time-frequency resources carrying downlink data are interrupted by the terminal equipment of a higher priority may be indicated to the terminal equipment via the downlink control information, hence, when the uplink data transmission and downlink data transmission of the terminal equipment are interrupted, the terminal equipment may be jointly indicated.

Embodiment 14

Embodiment 14 of this disclosure provides a communication system, including at least the network device 1300 in Embodiment 12 and the terminal equipment 1400 in Embodiment 13, contents therein being incorporated herein, and being not going to be described herein any further.

A workflow that the first time-frequency resource and the third time-frequency resource are interrupted is indicated to the terminal equipment 1400 in the communication system including the network device 1300 and the terminal equipment 1400 shall be described below by taking an implementation as an example. In this communication system, the number of terminal equipments 1400 is two, i.e. terminal equipment 1400-1 and terminal equipment 1400-2. In addition, the terminal equipments 1400A and 1400B are terminal equipments of high priorities; wherein the terminal equipment 1400A interrupts the third time-frequency resource, and the terminal equipment 1400B interrupts the first time-frequency resource.

Figure 15:
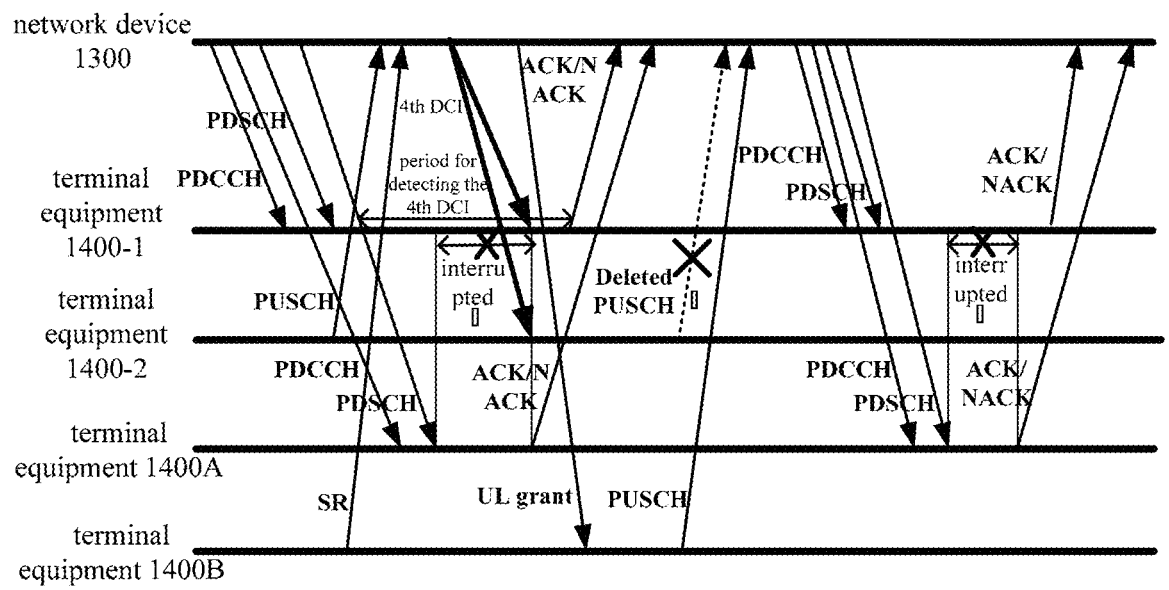
FIG. 15 is a workflow of the communication system of Embodiment 14 of this disclosure.

FIG. 15 is a schematic diagram of the workflow.

As shown in FIG. 15, in this implementation, a DCI format of fourth DCI signaling is different from a DCI format of the third DCI. The fourth DCI appears periodically, and the interrupted first time-frequency resource and third time-frequency resource are divided in the frequency domain in unit of the entire frequency band, and the fourth DCI is of a fixed bit length; and a time unit of the time-frequency resources is a symbol. As shown in FIG. 15, the workflow includes the following steps:

step 1: the network device 1300 transmits control information scheduling downlink data to the terminal equipment 1400A of a high priority;

step 2: the terminal equipment 1400B of a high priority transmits a scheduling request (SR) to the network device 1300;

step 3: the network device 1300 transmits, via higher layer signaling, configuration information to the terminal equipment 1400-1 and the terminal equipment 1400-2 of low priorities that are using resources shared with the terminal equipment 1400A and terminal equipment 1400B, so as to configure the terminal equipment 1400-1 and the terminal equipment 1400-2 as follows:

1) configuring the fourth DCI via higher layer signaling (such as Joint-Uplink-Downlink-Preemption);
2) configuring a radio network temporary identifier scrambling the fourth DCI via higher layer signaling (such as int-joint-Uplink-Downlink-RNTI);
3) configuring a set of serving cells {cell 1} of the terminal equipment 1400-1 and the terminal equipment 1400-2 via higher layer signaling (such as INT-cell-to-INT); for example, there is only cell 1 in the set;
4) configuring a position of a first sub-field to which each serving cell of the terminal equipments correspond in the first field via higher layer signaling (such as cell-to-INT), i.e. a mapping {cell 1↔preemption indication 1} between serving cells in the set of serving cells and a second sub-field; for example, preemption indication 1 is the second sub-field;
5) configuring a period for detecting the fourth DCI via higher layer signaling (such as Joint-DCI-UL-DL-PI-periodicity);
6) configuring that a bit length (i.e. a length of a data bit) in front of the position where the fourth DCI appears is 10 bits via higher layer signaling (such as joint-UL-DL-bit-length-front);
7) configuring that a bit length in the rear of the position where the fourth DCI appears is 36 bits via higher layer signaling (such as joint-UL-DL-bit-length-rear);
8) configuring that a length of time acting before the fourth DCI appears is 10 symbols via higher layer signaling (such as joint-UL-DL-time-length-front);
9) configuring that a length of time acting after the fourth DCI appears is 18 symbols via higher layer signaling (such as joint-UL-DL-time-length-rear);
10) configuring that a magnitude of a payload of a DCI format to be 46 bits via higher layer signaling (such as INT-DCI-payload-length), i.e. a sum of 10 bits and 36 bits in 6) and 7);
11) configuring a division manner {0,0} of interrupted time-frequency resource in the frequency domain for each serving cell in the set of serving cells via higher layer signaling (such as INT-TF-unit), denoting in division units of the entire frequency band in the frequency domain;
12) configuring via higher layer signaling (such as UL-preemption-method) that an interrupted method of uplink data transmission is that the terminal equipment transmits uplink data in the nonorthogonal multiple access manner on the indicated time-frequency resource (i.e. the first time-frequency resource);
13) configuring via higher layer signaling (such as UL-NOMA-method) that a method of nonorthogonal multiple access is multi-carrier interleave division multiple access (IDMA); and
14) configuring signatures in the above IDMA used for distinguishing users, i.e. interleavers, via higher layer signaling (such as UL-NOMA-signature);

step 4: the network device 1300 transmits downlink data information to the terminal equipment 1400A according to the above downlink control information transmitted to the terminal equipment 1400A;

step 5: the network device 1300 transmits the fourth DCI to the terminal equipment 1400-1 and the terminal equipment 1400-2 in a downlink control channel by using group-common DCI signaling;

1) the 10 bits before the fourth DCI appears are used to indicate symbols in the 10 symbols of the terminal equipment 1400-1 before the fourth DCI appears corresponding to downlink time-frequency resources that are interrupted; in particular, 1 bit represents one symbol, for example, a fourth to eighth symbols are interrupted, as shown in ① in FIG. 15, and values of the 10 bits are 0000111110;
2) the 36 bits after the fourth DCI appears are used to indicate symbols in the 18 symbols of the terminal equipment 1400-2 after the fourth DCI appears corresponding to an uplink time-frequency resource that is interrupted (i.e. the first time-frequency resource) and symbols of the terminal equipment 1400-1 corresponding to a downlink time-frequency resource that is interrupted (i.e. the third time-frequency resource); in particular, each 2 bits represent a symbol, values of the above 36 bit are, for example, 000000000000001111111100001111111100; the terminal equipment may determine whether the uplink data are interrupted or the downlink data are interrupted according to a state of the terminal equipment in receiving the fourth DCI and based on the values of the above 36 bits; for example, when the terminal equipment 1400-2 receives the fourth DCI, it is preparing for transmitting uplink data, allocated uplink time-frequency resources are 7th-10th symbols, and in the interrupted time-frequency resources indicated by the fourth DCI, the 7-10th symbols are interrupted in the entire frequency band; hence, the terminal equipment 1400-2 may determine that the 7-10th symbols are the interrupted uplink time-frequency resources; likewise, the terminal equipment 1400-1 may determine that 13th-16th symbols are interrupted on the entire frequency band according to the values of the above 36 bits and its state in receiving the fourth DCI, as shown respectively in ② and ③ in FIG. 15;

3) the above 46 bits of data to be transmitted are scrambling by the radio network temporary identifier configured via higher-layer signaling in 2) of step 3, and the scrambled fourth DCI is transmitted;

step 6: the network 1300 transmits an uplink grant (UL grant) to the terminal equipment 1400B;

step 7: the terminal equipment 1400-1 and terminal equipment 1400-2 of low priorities perform blind check on the fourth DCI during the monitoring period, for example:

a data transmission state of the terminal equipment 1400-1 in receiving the fourth DCI is of downlink data transmission, and the terminal equipment 1400-1 removes the data on the interrupted third time-frequency resource according to the detected fourth DCI, then demodulates the remaining data and feeds back information (such as ACK/NACK); the third time-frequency resource is totally included in the fourth time-frequency resource of the terminal equipment 1400-1 for transmitting downlink data;

a data transmission state of the terminal equipment 1400-2 in receiving the fourth DCI is of uplink data transmission, and the terminal equipment 1400-2 transmits the uplink data on the interrupted first time-frequency resource in a manner of interweaver division multiple access (IDMA) by using the interleavers configured via the higher-layer signaling according to the detected fourth DCI; the first time-frequency resource is totally included in the second time-frequency resource of the terminal equipment 1400-2 for transmitting uplink data;

step 8: the terminal equipment 1400A of a high priority demodulates downlink data information and feeding back information (such as ACK/NACK); and step 9: the terminal equipment 1400B of a high priority demodulates the UL grant and then transmitting the uplink data.

According to this embodiment, which time-frequency resources carrying uplink data are interrupted by a terminal equipment of a higher priority and which time-frequency resources carrying downlink data are interrupted by the terminal equipment of a higher priority may be indicated to the terminal equipment via the downlink control information, hence, when the uplink data transmission and downlink data transmission of the terminal equipment are interrupted, the terminal equipment may be jointly indicated.

An embodiment of this disclosure provides a computer storage medium, including a computer readable program code, which will cause an apparatus for transmitting downlink control information (DCI) or a network device to carry out the method for transmitting downlink control information (DCI) described in Embodiment 8.

An embodiment of the present disclosure provides a computer readable program code, which, when executed in an apparatus for transmitting downlink control information (DCI) or a network device, will cause the apparatus for transmitting downlink control information (DCI) or the network device to carry out the method for transmitting downlink control information (DCI) described in Embodiment 8.

An embodiment of this disclosure provides a computer storage medium, including a computer readable program code, which will cause an apparatus for receiving downlink control information (DCI) or a terminal equipment to carry out the method for receiving downlink control information (DCI) described in Embodiment 9.

An embodiment of the present disclosure provides a computer readable program code, which, when executed in an apparatus for receiving downlink control information (DCI) or a terminal equipment or a terminal equipment, will cause the apparatus for receiving downlink control information (DCI) or a terminal equipment or the terminal equipment to carry out the method for receiving downlink control information (DCI) described in Embodiment 9.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 4, 5, 11 and 12 may either correspond to software modules of procedures of a computer program, or correspond to hardware modules. Such software modules may respectively correspond to the steps shown in FIGS. 2, 3, 9 and 10. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 4, 5, 11 and 12 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 4, 5, 11 and 12 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

Following supplements are further provided in this disclosure.

1. An apparatus for transmitting downlink control information (DCI), configured in a network device, the apparatus including:
   a first transmitting unit configured to transmit to a terminal equipment first DCI indicating an interrupted first time-frequency resource used for transmitting uplink data, the first DCI at least including a first field indicating a position of the first time-frequency resource.

2. The apparatus according to supplement 1, wherein the first DCI is further used to indicate the terminal equipment not to transmit the uplink data carried by the first time-frequency resource on the first time-frequency resource, or transmit the uplink data carried by the first time-frequency resource at reduced power, or transmit the uplink data carried by the first time-frequency resource in a nonorthogonal multiple access manner.

3. The apparatus according to any one of supplements 1-2 wherein,
   a period used for monitoring the first DCI configured by the apparatus for the terminal equipment is less than or equal to a period used for monitoring second DCI configured by the apparatus for the terminal equipment, the second DCI being used for indicating the terminal equipment to transmit uplink data on a second time-frequency resource.

4. The apparatus according to any one of supplements 1-3, wherein,
   a DCI format of the first DCI is identical to or different from a DCI format of third DCI, the third DCI being used for indicating to the terminal equipment an interrupted third time-frequency resource used for transmitting downlink data.

5. The apparatus according to supplement 4, wherein, when the DCI format of the first DCI is identical to the DCI format of the third DCI, the first DCI is larger than the third DCI by an information field, an information bit in the information field being used for indicating whether currently transmitted DCI is the first DCI or the third DCI.

6. The apparatus according to supplement 4, wherein, when the DCI format of the first DCI is different from the DCI format of the third DCI,
   the first DCI is UE-specific DCI of the terminal equipment, or the first DCI is UE-group common DCI.

7. The apparatus according to any one of supplements 1-6, wherein the first field includes at least one first sub-field, the first sub-field corresponding to a serving cell of the terminal equipment.

8. The apparatus according to any one of supplements 1-7, wherein a length of the first sub-field is a predetermined length.

9. The apparatus according to supplement 7, wherein, when a division manner of a frequency domain of the interrupted first time-frequency resource is that a whole frequency band is taken as a division unit,
   one or more than one data bits of the first sub-field indicate whether a time unit in the frequency band is interrupted, or one data bit of the first sub-field indicates whether one or more than one time units in the frequency band are interrupted.

10. The apparatus according to supplement 7, wherein, when a division manner of a frequency domain of the interrupted first time-frequency resource is that a part of frequency band in a whole frequency band is taken as a division unit, a frequency domain of the interrupted data transmission resource is divided into two or more than two partial frequency bands,
    the first sub-field includes at least two groups of data bits, each group of data bits corresponding to said partial frequency bands,
    and in the groups of data bits, one or more than one data bits indicate whether one time unit in the partial frequency bands is interrupted, or, one data bit indicates whether one or more than one time units in the partial frequency bands are interrupted.

11. The apparatus according to any one of supplements 1-10, wherein the apparatus further includes:
    a second transmitting unit configured to transmit to the terminal equipment configuration information at least used for configuring the first DCI.

12. The apparatus according to supplement 11, wherein the configuration information is further used for at least one of the following:
    the configuration information is used for configuring that the terminal equipment does not transmit the uplink data carried by the first time-frequency resource, or transmits the uplink data carried by the first time-frequency resource at reduced power, or transmits the uplink data carried by the first time-frequency resource in a nonorthogonal multiple access manner;
    the configuration information is used for configuring that a manner of nonorthogonal multiple access is sparse code multiple access (SCMA), or multi-user shared access (MUSA), or interweaver division multiple access (IDMA), or other manners of nonorthogonal multiple access;
    the configuration information is used for configuring that signatures used for distinguishing users in nonorthogonal multiple access are sparse codewords, or nonorthogonal codewords, or interweavers, or other signatures used for distinguishing users;
    the configuration information is used for configuring a length of the first sub-field and/or a length of the first field;
    the configuration information is used for configuring that a division manner of the first time-frequency resource indicated by the first sub-field in the frequency domain is taking a whole frequency band as a division unit, or taking a part of frequency band as a division unit;

the configuration information is used for configuring that a time unit of the first time-frequency resource indicated by the first sub-field in the time domain is one or two or more than two slots, or one or two or more than two non-slots, or one or two or more than two mini-slots, or one or two or more than two symbols;

the configuration information is used for configuring a period for monitoring the first DCI for the terminal equipment;

the configuration information is used for configuring a set of serving cell indices of the terminal equipment;

the configuration information is used for configuring a position of a first sub-field of the terminal equipment to which each serving cell corresponds in the first field; and the configuration information is used for configuring a radio network temporary identifier (RNTI) scrambling the first DCI.

13. An apparatus for receiving downlink control information (DCI), configured in a terminal equipment, the apparatus including:

a first receiving unit configured to receive first DCI indicating an interrupted first time-frequency resource used for transmitting uplink data transmitted by a network device, the first DCI at least including a first field indicating a position of the first time-frequency resource.

14. The apparatus according to supplement 13, wherein the first DCI is further used to indicate the terminal equipment:

not to transmit the uplink data carried by the first time-frequency resource on the first time-frequency resource, or transmit the uplink data carried by the first time-frequency resource at reduced power, or transmit the uplink data carried by the first time-frequency resource in a nonorthogonal multiple access manner.

15. The apparatus according to either one of supplements 13 and 14, wherein, a period of the terminal equipment used for monitoring the first DCI is less than or equal to a period of the terminal equipment used for monitoring second DCI, the second DCI being used for indicating the terminal equipment to transmit uplink data on a second time-frequency resource.

16. The apparatus according to any one of supplements 13-15, wherein, a DCI format of the first DCI is identical to or different from a DCI format of third DCI, the third DCI being used for indicating to the terminal equipment an interrupted third time-frequency resource used for transmitting downlink data.

17. The apparatus according to supplement 16, wherein, when the DCI format of the first DCI is identical to the DCI format of the third DCI, the first DCI is larger than the third DCI by an information field, an information bit in the information field being used for indicating whether currently transmitted DCI is the first DCI or the third DCI.

18. The apparatus according to supplement 16, wherein, when the DCI format of the first DCI is different from the DCI format of the third DCI, the first DCI is UE-specific DCI of the terminal equipment, or the first DCI is UE-group common DCI.

19. The apparatus according to any one of supplements 13-18, wherein the first field includes at least one first sub-field, the first sub-field corresponding to a serving cell of the terminal equipment.

20. The apparatus according to any one of supplements 13-19, wherein a length of the first sub-field is a predetermined length.

21. The apparatus according to supplement 19, wherein, when a division manner of a frequency domain of the interrupted first time-frequency resource is that a whole frequency band is taken as a division unit, one or more than one data bits of the first sub-field indicate whether a time unit in the frequency band is interrupted, or one data bit of the first sub-field indicates whether one or more than one time units in the frequency band are interrupted.

22. The apparatus according to supplement 19, wherein, when a division manner of a frequency domain of the interrupted first time-frequency resource is that a part of frequency band in a whole frequency band is taken as a division unit, a frequency domain of the interrupted data transmission resource is divided into two or more than two partial frequency bands, the first sub-field includes at least two groups of data bits, each group of data bits corresponding to said partial frequency bands, and in the groups of data bits, one or more than one data bits indicate whether one time unit in the partial frequency bands is interrupted, or, one data bit indicates whether one or more than one time units in the partial frequency bands are interrupted.

23. The apparatus according to any one of supplements 13-22, wherein the apparatus further includes:

a second receiving unit configured to receive configuration information at least used for configuring the first DCI transmitted by the network device.

24. The apparatus according to supplement 23, wherein the configuration information is further used for at least one of the following:

the configuration information is used for configuring that the terminal equipment does not transmit the uplink data carried by the first time-frequency resource, or transmits the uplink data carried by the first time-frequency resource at reduced power, or transmits the uplink data carried by the first time-frequency resource in a nonorthogonal multiple access manner;

the configuration information is used for configuring that a manner of nonorthogonal multiple access is sparse code multiple access (SCMA), or multi-user shared access (MUSA), or interweaver division multiple access (IDMA), or other manners of nonorthogonal multiple access;

the configuration information is used for configuring that signatures used for distinguishing users in nonorthogonal multiple access are sparse codewords, or nonorthogonal codewords, or interweavers, or other signatures used for distinguishing users;

the configuration information is used for configuring a length of the first sub-field and/or a length of the first field;

the configuration information is used for configuring that a division manner of the first time-frequency resource indicated by the first sub-field in the frequency domain is taking a whole frequency band as a division unit, or taking a part of frequency band as a division unit;

the configuration information is used for configuring that a time unit of the first time-frequency resource indicated by the first sub-field in the time domain is one or two or more than two slots, or one or two or more than two non-slots, or one or two or more than two mini-slots, or one or two or more than two symbols;

the configuration information is used for configuring a period for monitoring the first DCI for the terminal equipment;

the configuration information is used for configuring a set of serving cell indices of the terminal equipment;

the configuration information is used for configuring a position of a first sub-field of the terminal equipment to which each serving cell corresponds in the first field; and the configuration information is used for configuring a radio network temporary identifier (RNTI) scrambling the first DCI.

25. The apparatus according to any one of supplements 13-24, wherein the first time-frequency resource and second time-frequency resource of the terminal equipment used for transmitting uplink data at least partially overlap;

and the apparatus further includes:

a first transmission controlling unit configured to control the apparatus not to transmit the uplink data, or transmit the uplink data at reduced power, or transmit the uplink data in a nonorthogonal multiple access manner, on the at least overlapped time-frequency resources.

26. A communication system, including a network device and a terminal equipment;

wherein the network device includes the apparatus for transmitting downlink control information (DCI) as described in any one of supplements 1-12, and the terminal equipment includes the apparatus for receiving downlink control information (DCI) as described in any one of supplements 13-25.

1a. An apparatus for transmitting downlink control information (DCI), configured in a network device, the apparatus including:

a third transmitting unit configured to transmit fourth DCI, the fourth DCI being used for indicating an interrupted first time-frequency resource used for transmitting uplink data and an interrupted third time-frequency resource used for transmitting downlink data, the fourth DCI at least including a second field indicating a position of the first time-frequency resource and a position of the third time-frequency resource.

2a. The apparatus according to supplement 1a, wherein the fourth DCI is further used to indicate the terminal equipment:

not to transmit the uplink data carried by the first time-frequency resource on the first time-frequency resource, or transmit the uplink data carried by the first time-frequency resource at reduced power, or transmit the uplink data carried by the first time-frequency resource in a nonorthogonal multiple access manner.

3a. The apparatus according to either one of supplements 1a and 2a, wherein, a period used for monitoring the fourth DCI configured by the network device for the terminal equipment is less than or equal to a period used for monitoring second DCI configured by the network device for the terminal equipment, the second DCI being used for indicating the terminal equipment to transmit uplink data on a second time-frequency resource.

4a. The apparatus according to any one of supplements 1a-3a, wherein, the third time-frequency resource is earlier or later in time than a time-frequency resource where the fourth DCI is located, and the first time-frequency resource is later in time than the time-frequency resource where the fourth DCI is located.

5a. The apparatus according to any one of supplements 1a-4a, wherein, a DCI format of the fourth DCI is identical to or different from a DCI format of third DCI, the third DCI being used for indicating to the terminal equipment an interrupted third time-frequency resource used for transmitting downlink data.

6a. The apparatus according to supplement 5a, wherein, when the DCI format of the fourth DCI is identical to the DCI format of the third DCI, the fourth DCI is larger than the third DCI by an information field, an information bit in the information field being used for indicating whether currently transmitted DCI is the fourth DCI or the third DCI.

7a. The apparatus according to supplement 5a, wherein, when the DCI format of the fourth DCI is different from the DCI format of the third DCI, the fourth DCI is UE-specific DCI of the terminal equipment, or the fourth DCI is UE-group common DCI.

8a. The apparatus according to any one of supplements 1a-7a, wherein the second field includes at least one second sub-field, the second sub-field corresponding to a serving cell of the terminal equipment.

9a. The apparatus according to supplement 8a, wherein a length of the second sub-field is predetermined.

10a. The apparatus according to supplement 8a, wherein, a first part of data bits in the second sub-field correspond to the first time-frequency resource;

and a second part of data bits in the second sub-field correspond to the third time-frequency resource.

11a. The apparatus according to supplement 8a, wherein, when a division manner/division manners of a frequency domain/frequency domains of the interrupted first time-frequency resource and/or the interrupted third time-frequency resource is/are that a whole frequency band is taken as a division unit, one or more than one data bits in the first part of data bits and/or the second part of data bits in the second sub-field indicate whether a time unit in the frequency band is interrupted, or one data bit indicates whether one or more than one time units in the frequency band are interrupted.

12a. The apparatus according to supplement 8a, wherein, when a division manner/division manners of a frequency domain/frequency domains of the interrupted first time-frequency resource and/or the interrupted third time-frequency resource is/are that a part of frequency band is taken as a division unit, a frequency domain of the interrupted data transmission resource is divided into two or more than two partial frequency bands, the first part of data bits and/or the second part of data bits in the second sub-field include(s) at least two groups of data bits, each group of data bits corresponding to said partial frequency bands, and in the groups of data bits, one or more than one data bits indicate whether one time unit in the partial frequency bands is interrupted, or, one data bit indicates whether one of more than one time units in the partial frequency bands are interrupted.

13a. The apparatus according to any one of supplements 1a-12a, wherein the apparatus further includes:

a fourth transmitting unit configured to transmit to the terminal equipment configuration information at least used for configuring the fourth DCI.

14a. The apparatus according to supplement 13a, wherein the configuration information is further used for at least one of the following:
- the configuration information is used for configuring that the terminal equipment does not transmit the uplink data carried by the first time-frequency resource, or transmits the uplink data carried by the first time-frequency resource at reduced power, or transmits the uplink data carried by the first time-frequency resource in a nonorthogonal multiple access manner;
- the configuration information is used for configuring that a manner of nonorthogonal multiple access of the terminal equipment is sparse code multiple access (SCMA), or multi-user shared access (MUSA), or interweaver division multiple access (IDMA), or other manners of nonorthogonal multiple access;
- the configuration information is used for configuring that signatures used for distinguishing users in nonorthogonal multiple access of the terminal equipment are sparse codewords, or nonorthogonal codewords, or interweavers, or other signatures used for distinguishing users;
- the configuration information is used for configuring a length of the second field and/or a length of the second sub-field;
- the configuration information is used for configuring for the terminal equipment that a division manner of the first time-frequency resource indicated by the second sub-field in the frequency domain is a whole frequency band, or a part of frequency band;
- the configuration information is used for configuring for the terminal equipment that a division granularity of the third time-frequency resource indicated by the second sub-field in the frequency domain is taking a whole frequency band as a division unit, or taking a part of frequency band as a division unit;
- the configuration information is used for configuring for the terminal equipment that a time unit of the first time-frequency resource and/or the third time-frequency resource indicated by the second sub-field is one or two or more than two slots, or one or two or more than two non-slots, or one or two or more than two mini-slots, or one or two or more than two symbols;
- the configuration information is used for configuring a period for monitoring the fourth DCI for the terminal equipment;
- the configuration information is used for configuring a set of serving cell indices of the terminal equipment;
- the configuration information is used for configuring a position of a second sub-field to which each serving cell of the terminal equipment corresponds in the second field; and
- the configuration information is used for configuring a radio network temporary identifier (RNTI) scrambling the fourth DCI.

1b. An apparatus for receiving downlink control information (DCI), configured in a terminal equipment, the apparatus including:
- a third receiving unit configured to receive fourth DCI from a network device,
- the fourth DCI being used for indicating an interrupted first time-frequency resource used for transmitting uplink data and an interrupted third time-frequency resource used for transmitting downlink data, the fourth DCI at least including a second field indicating a position of the first time-frequency resource and a position of the third time-frequency resource.

2b. The apparatus according to supplement 1b, wherein the fourth DCI is further used to indicate the terminal equipment:
- not to transmit the uplink data carried by the first time-frequency resource on the first time-frequency resource, or transmit the uplink data carried by the first time-frequency resource at reduced power, or transmit the uplink data carried by the first time-frequency resource in a nonorthogonal multiple access manner.

3b. The apparatus according to either one of supplements 1b and 2b, wherein,
a period used for monitoring the fourth DCI configured by the network device for the terminal equipment is less than or equal to a period used for monitoring second DCI configured by the network device, the second DCI being used for indicating the terminal equipment to transmit uplink data on a second time-frequency resource.

4b. The apparatus according to any one of supplements 1b-3b, wherein,
the third time-frequency resource is earlier or later in time than a time-frequency resource where the fourth DCI is located, and the first time-frequency resource is later in time than the time-frequency resource where the fourth DCI is located.

5b. The apparatus according to any one of supplements 1b-4b, wherein,
a DCI format of the fourth DCI is identical to or different from a DCI format of third DCI, the third DCI being used for indicating to the terminal equipment an interrupted third time-frequency resource used for transmitting downlink data.

6b. The apparatus according to supplement 5b, wherein, when the DCI format of the fourth DCI is identical to the DCI format of the third DCI, the fourth DCI is larger than the third DCI by an information field, an information bit in the information field being used for indicating whether currently transmitted DCI is the fourth DCI or the third DCI.

7b. The apparatus according to supplement 5b, wherein, when the DCI format of the fourth DCI is different from the DCI format of the third DCI,
the fourth DCI is UE-specific DCI of the terminal equipment, or the fourth DCI is UE-group common DCI.

8b. The apparatus according to any one of supplements 1b-7b, wherein the second field includes at least one second sub-field, the second sub-field corresponding to a serving cell of the terminal equipment.

9b. The apparatus according to supplement 8b, wherein a length of the second sub-field is predetermined.

10b. The apparatus according to supplement 8b, wherein, a first part of data bits in the second sub-field correspond to the first time-frequency resource;
and a second part of data bits in the second sub-field correspond to the third time-frequency resource.

11b. The apparatus according to supplement 8b, wherein, when a division manner/division manners of a frequency domain/frequency domains of the interrupted first time-frequency resource and/or the interrupted third time-frequency resource is/are that a whole frequency band is taken as a division unit,
one or more than one data bits in the first part of data bits and/or the second part of data bits in the second sub-field indicate whether a time unit in the frequency band is interrupted, or one data bit indicates whether one or more than one time units in the frequency band are interrupted.

12b. The apparatus according to supplement 8b, wherein, when a division manner/division manners of a frequency domain/frequency domains of the interrupted first time-frequency resource and/or the interrupted third time-frequency resource is/are that a part of frequency band is taken as a division unit, a frequency domain of the interrupted data transmission resource is divided into two or more than two partial frequency bands,
the first part of data bits and/or the second part of data bits in the second sub-field include(s) at least two groups of data bits, each group of data bits corresponding to said partial frequency bands,
and in the groups of data bits, one or more than one data bits indicate whether one time unit in the partial frequency bands is interrupted, or, one data bit indicates whether one or more than one time units in the partial frequency bands are interrupted.

13b. The apparatus according to any one of supplements 1b-12b, wherein the apparatus further includes:
a fourth receiving unit configured to receive configuration information at least used for configuring the fourth DCI.

14b. The apparatus according to supplement 13b, wherein the configuration information is further used for at least one of the following:
the configuration information is used for configuring that the terminal equipment does not transmit the uplink data carried by the first time-frequency resource, or transmits the uplink data carried by the first time-frequency resource at reduced power, or transmits the uplink data carried by the first time-frequency resource in a nonorthogonal multiple access manner;
the configuration information is used for configuring that a manner of nonorthogonal multiple access is sparse code multiple access (SCMA), or multi-user shared access (MUSA), or interweaver division multiple access (IDMA), or other manners of nonorthogonal multiple access;
the configuration information is used for configuring that signatures used for distinguishing users in nonorthogonal multiple access are sparse codewords, or nonorthogonal codewords, or interweavers, or other signatures used for distinguishing users;
the configuration information is used for configuring a length of the second field and/or a length of the second sub-field;
the configuration information is used for configuring that a division manner of the first time-frequency resource indicated by the second sub-field in the frequency domain is a whole frequency band, or a part of frequency band;
the configuration information is used for configuring for the terminal equipment that a division granularity of the third time-frequency resource indicated by the second sub-field in the frequency domain is taking a whole frequency band as a division unit, or taking a part of frequency band as a division unit;
the configuration information is used for configuring for the terminal equipment that a time unit of the first time-frequency resource and/or the third time-frequency resource indicated by the second sub-field is one or two or more than two slots, or one or two or more than two non-slots, or one or two or more than two mini-slots, or one or two or more than two symbols;
the configuration information is used for configuring a period for monitoring the fourth DCI for the terminal equipment;
the configuration information is used for configuring a set of serving cell indices of the terminal equipment;
the configuration information is used for configuring a position of a second sub-field to which each serving cell of the terminal equipment corresponds in the second field; and
the configuration information is used for configuring a radio network temporary identifier (RNTI) scrambling the fourth DCI.

15b. The apparatus according to any one of supplements 1b-14b, wherein, the first time-frequency resource and second time-frequency resource of the terminal equipment used for transmitting uplink data at least partially overlap;
and the apparatus further includes:
a second transmission controlling unit configured to, when a data transmission status of the terminal equipment in receiving the fourth DCI is uplink data transmission, control the terminal equipment not to transmit the uplink data, or transmit the uplink data at reduced power, or transmit the uplink data in a nonorthogonal multiple access manner, on the at least overlapped time-frequency resources.

16b. The apparatus according to any one of supplements 1b-14b, wherein,
the third time-frequency resource and fourth time-frequency resource of the terminal equipment used for transmitting downlink data at least partially overlap;
and the apparatus further includes:
a first reception controlling unit configured to, when a data transmission status of the terminal equipment in receiving the fourth DCI is downlink data transmission, control the terminal equipment to delete downlink data received on the overlapped time-frequency resources.

What is claimed is:

1. An apparatus for transmitting downlink control information (DCI), configured in a network device, the apparatus comprising:
a memory that stores a plurality of instructions;
processor circuitry that couples to the memory and is configured to execute the instructions to:
transmit to a terminal equipment first DCI indicating stopping of transmission of uplink data using first time-frequency resource, the first DCI at least comprising a first field corresponding to a position of the first time-frequency resource,
wherein the first field comprises at least one first sub-field, each first sub-field of the at least one first sub-field corresponding to a serving cell of the terminal equipment; and
transmit a higher layer signaling including configuration information for configuring the first DCI,
wherein the configuration information is used for configuring a position of each first sub-field of the at least one first sub field of the terminal equipment to which each serving cell corresponds in the first field, and
wherein the configuration information is further used for configuring a length of the at least one first sub-field and a length of the first field.

2. The apparatus according to claim 1, wherein the first DCI is further used to indicate the terminal equipment not to transmit the uplink data carried by the first time-frequency resource on the first time-frequency resource, or transmit the uplink data carried by the first time-frequency resource at reduced power, or transmit the uplink data carried by the first time-frequency resource in a nonorthogonal multiple access manner.

3. The apparatus according to claim 1, wherein, a period used for monitoring the first DCI configured by the apparatus for the terminal equipment is less than or equal to a period used for monitoring second DCI configured by the apparatus for the terminal equipment, the second DCI being used for indicating the terminal equipment to transmit uplink data on a second time-frequency resource.

4. The apparatus according to claim 1, wherein, a DCI format of the first DCI is identical to or different from a DCI format of third DCI, the third DCI being used for indicating to the terminal equipment an interrupted third time-frequency resource used for transmitting downlink data, wherein the DCI format of third DCI is DCI format 2_1.

5. The apparatus according to claim 4, wherein, when the DCI format of the first DCI is identical to the DCI format of the third DCI, the first DCI is larger than the third DCI by an information field, an information bit in the information field being used for indicating whether currently transmitted DCI is the first DCI or the third DCI.

6. The apparatus according to claim 4, wherein,
when the DCI format of the first DCI is different from the DCI format of the third DCI,
the first DCI is UE-specific DCI of the terminal equipment, or the first DCI is UE-group common DCI.

7. The apparatus according to claim 1, wherein,
when a division manner of a frequency domain of the interrupted first time-frequency resource is that a whole frequency band is taken as a division unit,
one or more than one data bits of the at least one first sub-field indicate whether a time unit in the frequency band is interrupted, or one data bit of the at least one first sub-field indicates whether one or more than one time units in the frequency band are interrupted.

8. An apparatus for receiving downlink control information (DCI), configured in a terminal equipment, the apparatus comprising:
a memory that stores a plurality of instructions;
processor circuitry that couples to the memory and is configured to execute the instructions to:
receive first DCI indicating stopping of transmission of uplink data using first time-frequency resource, the first DCI at least corresponding to a first field indicating a position of the first time-frequency resource, wherein the first field comprises at least one first sub-field, each first sub-field of the at least one first sub-field corresponding to a serving cell of the terminal equipment, and
receive a higher layer signaling including configuration information for configuring the first DCI, wherein the configuration information is used for configuring a position of each first sub-field of the at least one first sub-field of the terminal equipment to which each serving cell corresponds in the first field, and
wherein the configuration information is further used for configuring a length of the at least one first sub-field and a length of the first field.

9. The apparatus according to claim 8, wherein the first DCI is further used to indicate the terminal equipment:
not to transmit the uplink data carried by the first time-frequency resource on the first time-frequency resource, or transmit the uplink data carried by the first time-frequency resource at reduced power, or transmit the uplink data carried by the first time-frequency resource in a nonorthogonal multiple access manner.

10. The apparatus according to claim 8, wherein,
a DCI format of the first DCI is identical to or different from a DCI format of third DCI, the third DCI being used for indicating to the terminal equipment an interrupted third time-frequency resource used for transmitting downlink data,
wherein the DCI format of third DCI is DCI format 2_1.

11. The apparatus according to claim 10, wherein,
when the DCI format of the first DCI is different from the DCI format of the third DCI,
the first DCI is UE-specific DCI of the terminal equipment, or the first DCI is UE-group common DCI.

12. The apparatus according to claim 8, wherein,
when a division manner of a frequency domain of the interrupted first time-frequency resource is that a whole frequency band is taken as a division unit,
one or more than one data bits of the at least one first sub-field indicate whether a time unit in the frequency band is interrupted, or one data bit of the at least one first sub-field indicates whether one or more than one time units in the frequency band are interrupted.

13. The apparatus according to claim 8, wherein the first time-frequency resource and second time-frequency resource of the terminal equipment used for transmitting uplink data at least partially overlap; and
the processor circuitry is further configured to control the apparatus not to transmit the uplink data, or transmit the uplink data at reduced power, or transmit the uplink data in a nonorthogonal multiple access manner, on the at least overlapped time-frequency resources.

14. A communication system, comprising:
a network device; and
a terminal equipment;
wherein the network device comprises an apparatus for transmitting downlink control information (DCI), the apparatus comprising:
a transmitter configured to:
transmit to the terminal equipment first DCI indicating stopping of transmission of uplink data using first time-frequency resource, the first DCI at least comprising a first field indicating a position of the first time-frequency resource, and
transmit a higher layer signaling including configuration information for configuring the first DCI, wherein the configuration information is used for configuring a position of each first sub-field of the at least one first sub-field of the terminal equipment to which each serving cell corresponds in the first field, wherein the configuration information is further us for configuring a length of the at least one first sub-field and a length of the first field, and wherein
the terminal equipment comprising an apparatus for receiving downlink control information (DCI), the apparatus comprising:
a receiver configured to receive the first DCI indicating stopping of transmission of uplink data using first time-frequency resource, the first DCI at least comprising a first field indicating a position of the first time-frequency resource,
wherein the first field comprises at least one first sub-field, each first sub-field of the at least one first sub-field corresponding to a serving cell of the terminal equipment.

* * * * *